(12) United States Patent
Stephens et al.

(10) Patent No.: US 12,288,071 B2
(45) Date of Patent: Apr. 29, 2025

(54) REGISTER ADDRESSING INFORMATION FOR DATA TRANSFER INSTRUCTION

(71) Applicant: ARM LIMITED, Cambridge (GB)

(72) Inventors: Nigel John Stephens, Cambridge (GB); Jelena Milanovic, Sophia Antipolis (FR); David Hennah Mansell, Cambridge (GB)

(73) Assignee: Arm Limited, Cambridge (GB)

( * ) Notice: Subject to any disclaimer, the term of this patent is extended or adjusted under 35 U.S.C. 154(b) by 144 days.

(21) Appl. No.: 18/006,806

(22) PCT Filed: Jul. 5, 2021

(86) PCT No.: PCT/GB2021/051704
§ 371 (c)(1),
(2) Date: Jan. 25, 2023

(87) PCT Pub. No.: WO2022/023701
PCT Pub. Date: Feb. 3, 2022

(65) Prior Publication Data
US 2023/0289186 A1   Sep. 14, 2023

(30) Foreign Application Priority Data

Jul. 30, 2020 (GB) .................................... 2011874

(51) Int. Cl.
*G06F 9/30* (2018.01)
(52) U.S. Cl.
CPC ........ *G06F 9/3016* (2013.01); *G06F 9/30036* (2013.01); *G06F 9/30038* (2023.08); *G06F 9/30105* (2013.01)
(58) Field of Classification Search
CPC ............... G06F 9/3016; G06F 9/30105; G06F 9/30038; G06F 9/30043; G06F 9/30036; G06F 9/30
See application file for complete search history.

(56) References Cited

U.S. PATENT DOCUMENTS 6,175,892 B1   1/2001   Sazzad et al.
7,376,782 B2 * 5/2008   Balraj .................. G06F 9/4401
                                                               711/2
(Continued)

FOREIGN PATENT DOCUMENTS

CN        108139907          6/2018
EP        3499362 A1 *       6/2019   .............. G06F 7/50
(Continued)

OTHER PUBLICATIONS

Office Action for GB Application No. 2011874.1 dated Jun. 29, 2023, 6 pages.
(Continued)

*Primary Examiner* — Farley Abad
(74) *Attorney, Agent, or Firm* — NIXON & VANDERHYE P.C.

(57) ABSTRACT

A data transfer instruction is provided which specifies register addressing information for identifying a target portion of the register storage. In response to the data transfer instruction, instruction decoding circuitry controls processing circuitry to perform a data transfer operation to transfer data to or from the target portion of the register storage. The register addressing information includes at least: a base register identifier identifying a base register of the register storage for storing a base value; and an immediate value specified in an encoding of the data transfer instruction, the immediate value representing a value to be added to the base value to provide an index value for selecting the target portion of the register storage. This can be useful to provide an instruction set architecture which supports code that is scalable to variable data structure sizes, and which supports loop unrolling.

19 Claims, 15 Drawing Sheets

(56) References Cited

U.S. PATENT DOCUMENTS

| | | | | |
|---|---|---|---|---|
| 7,647,489 B2* | 1/2010 | Butcher | ............... | G06F 9/323 |
| | | | | 712/242 |
| 2010/0318766 A1* | 12/2010 | Tsuji | ............... | G06F 9/30109 |
| | | | | 712/E9.002 |
| 2012/0151156 A1 | 6/2012 | Citron et al. | | |
| 2014/0189296 A1* | 7/2014 | Ould-Ahmed-Vall | ....................... | |
| | | | | G06F 9/3824 |
| | | | | 712/22 |

FOREIGN PATENT DOCUMENTS

| | | | | |
|---|---|---|---|---|
| GB | 2543303 A | * | 4/2017 | ......... G06F 15/8053 |
| TW | 201732547 | | 9/2017 | |
| TW | 201732551 | | 9/2017 | |
| WO | 2017/064455 A1 | | 4/2017 | |

OTHER PUBLICATIONS

Electrical Engineering Stack Exchange, "Microprocessors/Microcontrollers—Do registers have addresses?" 2013, https://electronics.stackexchange.com/questions/60176/microprocessors-microcontrollers-do-registers-have-addresses, 5 pages.

J. Navaridas, "COMP15111: Introduction to Architecture Lecture 7: Addresses and Addressing" University of Manchester, undergraduate lecture notes, 2015, http://syllabus.cs.manchester.ac.uk/ugt/2015/COMP15111/handout/handout7.pdf, 34 pages.

Robert Bedichek, "Some Efficient Architecture Simulation Techniques", Department of Computer Science, FR-35 University of Washington Seattle, Washington 98195 robertb@cs.washington.edu, 1990.

Office Action for TW Application No. 110128068 dated Sep. 30, 2024 and English translation, 23 pages.

Office Action for EP Application No. 21742469.6 dated Nov. 25, 2024, 5 pages.

* cited by examiner y encoded with $N_{imm}$ bits where at element size E $2^{N_{imm}} \leq$ no. of elements of size E that can fit within vector register of size $MVL_{min}$

```
C[NxM] (row major) = A[NxK] (column major) * B[KxM] (row major)

dim = MVL / 32;  // vector elements
For (n = 0; n < N; n += 2*dim) {
  for (m = 0; m < M; m += 2*dim) {
    sfloat32_t ZA0,ZA1,ZA2,ZA3 = {0,0,0,0};
    for (k = 0; k < K; k += 1) {
      svfloat32_t Z4 = A[k][n+0];          // load col 0
      svfloat32_t Z5 = A[k][n+dim];        // load col 1
      svfloat32_t Z6 = B[k][m+0];          // load row 0
      svfloat32_t Z7 = B[k][m+dim];        // load row 1
      ZA0 += Z4 ⊗ Z6;  ZA1 += Z4 ⊗ Z7;    // outer products
      ZA2 += Z5 ⊗ Z6;  ZA3 += Z5 ⊗ Z7;
    }
    for (i = 0; i < dim; i++) {
      C[n+i+0][m]    = ZA0H[i];  C[n+i+0][m+dim]    = ZA1H[i];
      C[n+i+dim][m]  = ZA2H[i];  C[n+i+dim][m+dim]  = ZA3H[i];
    }
  }
}
```

```
mstart za [...]
   innerloop:
   // Load LHS columns
   ld1w { z4.s }, p0/Z, [x16]
   ld1w { z5.s }, p1/Z, [x16, #1, MUL VL]
   // Load RHS rows
   ld1w { z6.s }, p4/Z, [x15]
   ld1w { z7.s }, p5/Z, [x15, #1, MUL VL]
   // Perform outer products
   fmopa za0.s, p0/M, p4/M, z4.s, z6.s
   fmopa za1.s, p0/M, p5/M, z4.s, z7.s
   fmopa za2.s, p1/M, p4/M, z5.s, z6.s
   fmopa za3.s, p1/M, p5/M, z5.s, z7.s
   [...]
   bit  innerloop
   // Store ZA0-ZA3 rows
   mov w12, #0
1: st1w { za0h.s[w12, #0] }, p0, p4, [x17, xzr, lsl #2]
   st1w { za1h.s[w12, #0] }, p0, p5, [x17, x2,  lsl #2]
   st1w { za2h.s[w12, #0] }, p1, p4, [x17, x3,  lsl #2]
   st1w { za3h.s[w12, #0] }, p1, p5, [x17, x4,  lsl #2]
   add  x17, x17, x2, lsl #3  // x17 += 2*dim
   add  w12, w12, #1
   cmp  w12, dim
   bit  1b
   [...]
   mstop
```

FIG. 14

REGISTER ADDRESSING INFORMATION FOR DATA TRANSFER INSTRUCTION

The present technique relates to the field of data processing.

Data transfer instructions may be used in data processing to control transfer of data to or from register storage.

At least some examples provide an apparatus comprising: instruction decoding circuitry to decode instructions; register storage to store data; and processing circuitry to perform data processing in response to an instruction decoded by the instruction decoding circuitry, to generate a processing result to be written to at least one register of the register storage; in which: in response to a data transfer instruction specifying register addressing information for identifying a target portion of the register storage, the instruction decoding circuitry is configured to control the processing circuitry to perform a data transfer operation to transfer data to or from the target portion of the register storage; and the register addressing information includes at least: a base register identifier identifying a base register of the register storage for storing a base value; and an immediate value specified in an encoding of the data transfer instruction, the immediate value representing a value to be added to the base value to provide an index value for selecting the target portion of the register storage.

At least some examples provide a method comprising: decoding an instruction; and in response to the decoded instruction, controlling processing circuitry to perform data processing to generate a processing result to be written to at least one register of register storage; in which: in response to a data transfer instruction specifying register addressing information for identifying a target portion of the register storage, the processing circuitry is controlled to perform a data transfer operation to transfer data to or from the target portion of the register storage; and the register addressing information includes at least: a base register identifier identifying a base register of the register storage for storing a base value; and an immediate value specified in an encoding of the data transfer instruction, the immediate value representing a value to be added to the base value to provide an index value for selecting the target portion of the register storage.

A computer program for controlling a host data processing apparatus to provide an instruction execution environment for execution of instructions of target code, the computer program comprising: instruction decoding program logic to decode instructions of the target code to control the host data processing apparatus to perform processing operations corresponding to the decoded instructions; and register emulating program logic to maintain a register emulating data structure in host storage of the host data processing apparatus to emulate register storage of a target instruction set architecture associated with the target code; in which in response to a data transfer instruction specifying register addressing information for identifying a target portion of the register storage, the instruction decoding program logic is configured to control the host data processing apparatus to perform a data transfer operation to transfer data to or from locations of the register emulating data structure corresponding to the target portion of the register storage; and the register addressing information includes at least: a base register identifier identifying a base register of the register storage for storing a base value; and an immediate value specified in an encoding of the data transfer instruction, the immediate value representing a value to be added to the base value to provide an index value for selecting the target portion of the register storage.

At least some examples provide a storage medium storing the computer program described above. The storage medium may be a transitory storage medium or a non-transitory storage medium.

Further aspects, features and advantages of the present technique will be apparent from the following description of examples, which is to be read in conjunction with the accompanying drawings, in which:

FIG. 1 schematically illustrates a first example of a data processing apparatus supporting matrix processing;

FIG. 14 shows an example of program code using the data transfer instruction of FIG. 12;

Figure 1:
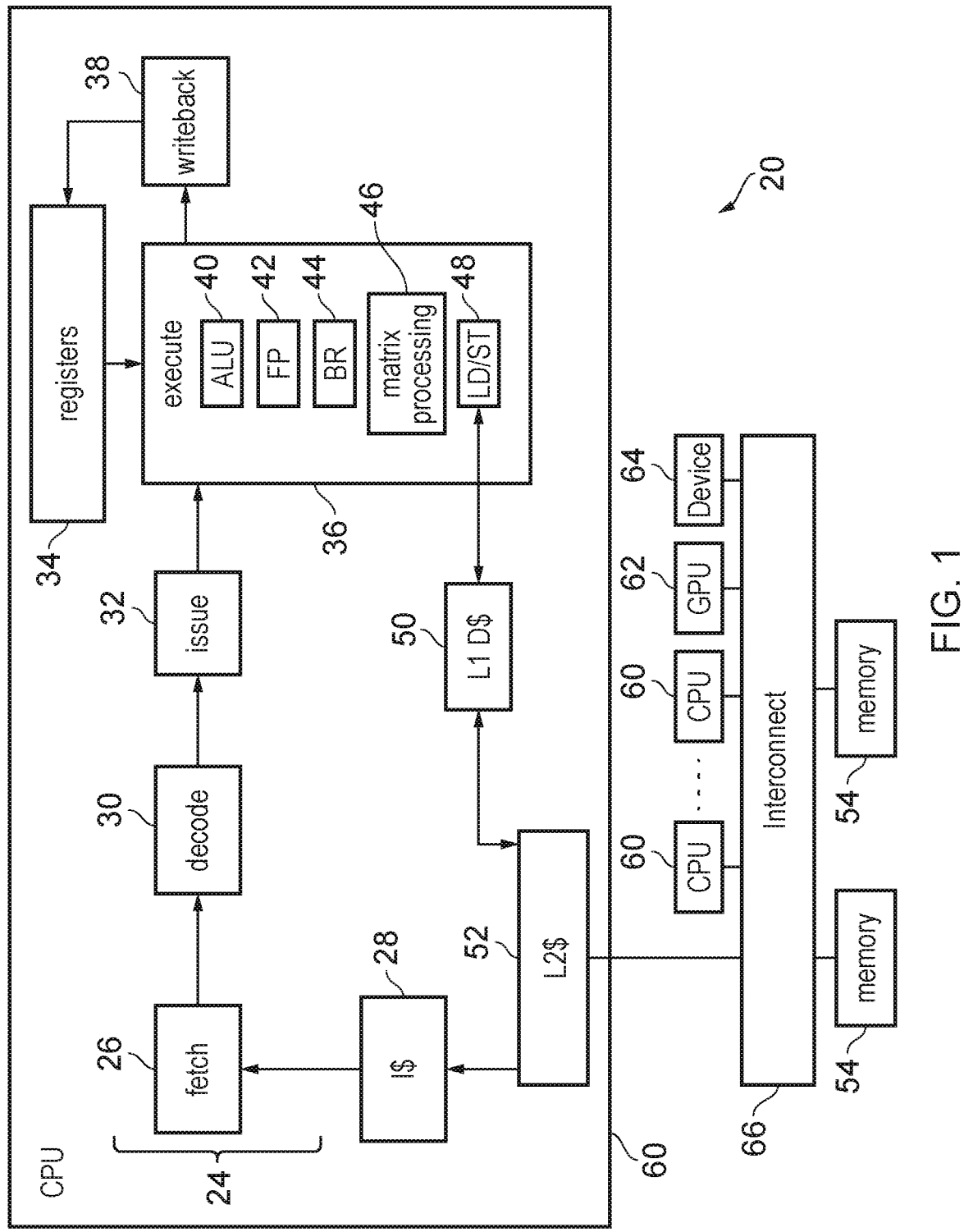

A data processing apparatus may have instruction decoding circuitry for decoding instructions and processing circuitry for performing data processing in response to decoded instructions. Register storage may be provided to store data. The register storage can be used to provide operands for processing by the processing circuitry. When the processing circuitry generates a processing result in response to an instruction, the processing result may be written to at least one register of the register storage.

A data transfer instruction is provided for transferring data to or from the register storage. In response to the data transfer instruction, instruction decoding circuitry controls processing circuitry to perform a data transfer operation. The data transfer operation comprises transferring data to or from a target portion of the register storage. The data transfer instruction specifies register addressing information which identifies the target portion of the register storage.

In typical data transfer instructions, a register to use as the target portion of the register storage may be identified by a register field in the instruction encoding, where the value in the register field is an identifier directly specifying the architectural register to/from which data is to be transferred.

However, in the examples discussed below, the register addressing information includes at least a base register identifier and an immediate value. The base register identifier identifies a base register of the register storage for storing a base value, and the immediate value is specified directly in the encoding of the data transfer instruction and represents a value to be added to the base value to provide an index value for selecting the target portion of the register storage for which the data is to be transferred to memory or to which the data is to be transferred from memory.

This approach of using a base register and an immediate to define the register addressing information would be seen as counter-intuitive by a skilled person in the field of instructions set architecture design. While base register and immediate value based addressing may be known for memory addressing, it would appear to be unnecessary for register addressing, because one would expect that the particular registers to be accessed in a data transfer can be directly selected by a compiler of the program code to be executed and so do not need to use an indirect reference to a base register. However, the inventors recognised that register addressing information using a base register to provide a base value for generating the index to select the target portion of the register storage can be useful to allow compilers to generate code which can adapt dynamically to scalable data storage sizes.

Also, using an immediate value to provide an offset to be added to the base value when generating the index value can be useful to enable compilers to use a technique called loop unrolling which can help to reduce the overhead of controlling iteration of program loops. Each iteration of the loop may incur a performance cost in executing loop controlling instructions such as instructions for incrementing a loop counter or other variables such as the base value in the base register of the data transfer instruction, and in testing whether a loop termination condition is met. By performing loop unrolling, a compiler may map a group of two or more iterations of a loop included in high-level code written by a programmer to a single loop iteration in the compiled code performing the same operations as the two or more iterations in the high-level code loop. This reduces the number of times the loop control instructions need to be executed for a given number of loop iterations in the high-level code, and enables greater instruction level parallelism as it may be that some instructions from a subsequent iteration of the loop in the high-level code can be executed in parallel with instructions of an earlier iteration if they are independent, whereas if the loop had been compiled into code implementing a single high-level loop iteration per iteration of the loop in the compiled code, then the instructions for a subsequent iteration of the high-level loop may be dependent on instructions from an earlier iteration reducing the amount of parallelism that is possible. The use of a base register and an immediate value for defining the register addressing information is useful for supporting loop unrolling because the immediate value can be used to add on different offsets to the value in the base register for different data transfer instructions corresponding to the unrolled versions of separate iterations of the high-level code loop which are combined into a single loop iteration in the compiled code.

Hence, in summary the data transfer instruction with the register addressing information defined using the base register identifier and the immediate value as described above can be particularly useful for supporting scalable code which may scale to different data storage sizes and which can allow compilers to perform loop unrolling.

The immediate value represents a value to be added to the base value to provide the index value for selecting the target portion of the register storage. In some implementations of the instruction, the value to be added to the base value may be the exact value specified as the immediate value. In other examples, the immediate value may have an encoding which does not directly specify the value to be added. For example, the immediate value may specify the value to be added as a multiple of a given constant Z, so that the product of Z and the immediate value is added to the base value.

Also, in some examples the index value may equal the sum of the base value and the value represented by the immediate value. In other examples, the index value may depend on an addition of the base value and the value represented by the immediate value, but may not exactly equal the sum of the base value and the value represented by the immediate value. For example, to deal with out of range values of the base value, in some cases the index value could correspond to the sum of the base value and the value represented by the immediate value, modulo a given value selected to ensure the resulting index is within a required range (that is, the index value is the remainder after dividing the sum by the given value).

The encoding of the register addressing information using a base register identifier and an immediate value could be applied to any form of data transfer instruction, including data transfer instructions for which the index value is used to select which integer register, floating-point register, vector register, or other type of register storage is to be accessed in the data transfer.

However, in one example the register storage comprises two-dimensional (2D) array register storage to store at least one 2D array of data, and the target portion of the register storage comprises a target portion of the 2D array register storage. Hence, in this example the data transfer instruction may be an array data transfer instruction to transfer at least part of a 2D array of data to or from the array register storage. 2D arrays, such as matrices, are useful for a wide range of processing applications. One example is in the field of machine learning, where matrix multiplication may be the backbone of the inference and training algorithms for many types of machine learning models, but other applications may also use matrix arithmetic, such as in the field of augmented reality, virtual reality, computer vision, computational photography, scientific simulation, digital signal processing, and so on. Hence, support for matrix arithmetic is likely to be an important feature of processing applications going forward, and so by providing 2D array register storage designed for storing 2D arrays of data this can be useful to support such applications. The term "tile" is used in some instances below to refer to a 2D array of data.

The data transfer instruction with the register addressing information comprising the base register identifier and the immediate value can be particularly useful for systems supporting 2D array register storage, as applications involving processing of 2D arrays of data may need to be scalable to deal with varying array sizes in two dimensions of the array structure. By specifying register addressing information for identifying the target portion of the register storage using a base register identifier and an immediate value, it is possible to define program loops which can vary which registers are accessed depending on a variable array dimension, which can be useful for processing 2D arrays of data.

In one example the data transfer operation performed in response to the data transfer instruction may comprise transferring a sub-portion of a target 2D array to or from the target portion of the 2D array register storage, where the index value generated from the base value and the immediate value may identify which particular sub-portion of the target 2D array is to be transferred. For example, the base value and immediate value can be used to define program loops which iterate over respective sub-portions of a target 2D array.

For example, the index value may identify, as the sub-portion, a single horizontal group of elements sharing a same vertical position within the target 2D array or a single vertical group of elements sharing a same horizontal position within the target 2D array. Other implementations may allow a single data transfer instruction to transfer multiple horizontal groups of elements or multiple vertical groups of elements of the target 2D array. Either way, by using a base register and an immediate value which selects which sub-portion of the target 2D array is to be transferred, this makes it easier for software to be scalable to different array dimensions (different numbers of rows or columns).

In this application, the terms "horizontal" and "vertical" are used to refer to the "row" and "column" directions of the 2D array as seen from the perspective of the 2D array register storage. Rather the "horizontal" and "vertical" directions refer to the logical arrangement of the elements in a 2D array, in the sense that computation instructions or instructions for transferring the 2D array to/from memory take account of the logical position of each element within a 2D array. However, it will be appreciated that the physical layout of the register storage may not necessarily be arranged in a 2D grid of storage elements. It is possible to physically dispose the storage elements at any position that is convenient within an integrated circuit layout.

The "horizontal" and "vertical" directions associated with the 2D array as stored in the 2D array register storage may not necessarily correspond to the same row/column layout of matrix data structures stored in memory. It is possible to store matrix data in memory in different layouts, such as a row-major order or a column-major order. In row-major order, adjacent elements of a matrix row are stored at consecutive addresses in memory, but adjacent elements of a matrix column are offset in memory by a stride value. Conversely, in column-major order, adjacent elements of a matrix column are stored at consecutive addresses in memory, but adjacent elements of a matrix row are offset in memory by a stride value.

Hence, when data is read from memory, it could be in either row-major order (so that consecutive memory elements read into the register storage represent a row of the underlying matrix structure in memory, or a part of a row) or in column-major order (so that consecutive memory elements read in represent a column or part of a column), but either way it is possible to write the elements into a horizontal group of elements or a vertical group of elements in the 2D array register storage.

Therefore, it will be appreciated that a horizontal group of elements in the 2D array register storage could represent either a row or a column of elements from a matrix structure in memory (or a newly computed set of elements which may subsequently be written back either to a row or a column of elements in a matrix structure in memory). Similarly, a vertical group of elements in the 2D array register storage could represent either a row or a column of elements from the underlying matrix structure stored in memory (or could represent newly computed values to be written back to such a row or column). To avoid confusion, the terms "row" and "column" will be used to refer to the arrangement of matrix elements in memory, and "horizontal group" and "vertical group" may be used to refer to the arrangement of elements in the 2D array stored in the 2D array register storage.

In some implementations, the data transfer instruction may only support transferring data to/from the 2D array register storage in one of the horizontal/vertical directions. For example, some implementations could only support access to the 2D array register storage in the horizontal direction. This can simplify the circuit logic for accessing the 2D array register storage.

However, in other examples the instruction set architecture (ISA) may support reading/writing the 2D array register storage in both the horizontal and vertical directions. Hence, the data transfer instruction may specify an array direction identifier identifying one of a horizontal direction and a vertical direction. When the array direction identifier identifies the horizontal direction, the sub-portion of the target 2D array comprises at least one horizontal group of elements of the target 2D array identified by the index value, each horizontal group of elements comprising elements sharing a same vertical position within the target 2D array. When the array direction identifier identifies the vertical direction, the sub-portion of the target 2D array comprises at least one vertical group of elements of the target 2D array identified by the index value, each vertical group of elements comprising elements sharing a same horizontal position within the target 2D array. This can be useful for enabling on-the-fly transposition of a matrix at the point of transferring data into the 2D array register storage from memory, or when transferring data back to memory from the 2D array register storage, which helps to improve performance for applications where the matrix memory layouts are not compatible with the requirements of the computation, as such on-the-fly transposition can be much faster than executing a large number of load/store instructions or vector permute instructions to shuffle elements around when transferring matrix data between memory and the register storage.

The data transfer instruction could be used in embodiments which handle 2D arrays defined with a certain fixed data element size, where the element size refers to the number of bits in one single element of the 2D array.

However, it can be useful to support variable data element sizes, so that the data transfer instruction can be used for applications which may process matrices defined using data values of different levels of precision. Hence, the data transfer instruction may be associated with a current data element size E specified for the data transfer instruction from among two or more data element sizes supported by the processing circuitry.

The current data element size E could be specified for the data transfer instruction in various ways. In some cases, a parameter of the data transfer instruction itself may specify the current data element size E. For example, part of the instruction encoding of the data transfer instruction may specify the current data element size E. Another option is that control information stored in a control register or other storage location could define the current data element size E. in this case, the encoding of the data transfer instruction itself need not include any bits identifying the current data element size E. An instruction executed prior to execution of the data transfer instruction could be used to set the value in the control storage location to set the current data element size E to be used for subsequent data transfer instructions. Some approaches could also use a modal approach, where the current data element size used depends on a mode of operation in which the processing circuitry is operating at the time of executing the data transfer instruction. Hence, it will be appreciated that there are a variety of ways in which the current data element size E for a given data transfer instruction could be identified.

In implementations which support variable data element size, the immediate value of the register addressing information may be encoded using a certain number of bits, $N_{imm}$, of an instruction encoding of the data transfer instruction, where $N_{imm}$ is variable depending on the current data element size E, with $N_{imm}$ increasing as E decreases. This approach can be particularly useful in cases where the immediate value is used to generate an index which identifies which sub-portion of the target 2D array is to be transferred in the data transfer performed in response to the data transfer instruction. As the data element size decreases, this means that a greater number of data elements can fit within a register of a given size, supporting a 2D array with a larger dimension in a first direction of the horizontal/vertical directions corresponding to the width of the register. By increasing the size of the immediate value as the element size decreases, this allows a larger number of sub-portions of the target 2D array to be selected, enabling the second dimension of the 2D array in the opposite vertical/horizontal direction to scale in a comparable manner with the scaling in the first direction. By using an encoding of the immediate value which has a variable length so that the immediate value is encoded using a smaller number of bits when the data element size is larger than when the data element size is smaller, at the larger element sizes this may free up some extra bits which could be used for encoding other parameters.

In one example the 2D array register storage may comprise a certain number $N_R$ of vector registers with each vector register comprising a certain number of bits, MVL (MVL indicating the "vector length" of a single vector register). By implementing the 2D array register storage as a group of vector registers this can simplify the implementation of the micro-architecture of the processor, as techniques for providing vector registers used for storing 1D arrays of data as vectors can be reused to implement the 2D array register storage. For example a single 2D array of data could be represented within a group of vector registers with each vector register in the group storing a different horizontal (or vertical) group of elements of the 2D array, and the group of vector registers as a whole storing multiple such groups of elements to form the 2D array. In some implementations, the ISA supported by the processing circuitry and the instruction decoding circuitry may support a variable vector length MVL for the vector registers of the 2D array register storage. This allows micro-architectural designers to vary the size of the registers used on a given micro-architectural processor implementation, depending on design preferences such as whether to priorities higher performance or higher energy efficiency. For example, the ISA may support a range of vector lengths extending from a minimum vector length $MVL_{min}$ to a maximum vector length $MVL_{max}$.

To simplify software development, it can be useful to design the ISA so that program code can operate correctly on a range of processors using different vector lengths MVL, without requiring any modification of the program code to account for such differences in vector length. This property may be referred to as the program code being vector length agnostic. For example, the ISA may support a register which indicates the vector length implemented on the current platform, which could be static for a given implementation but could vary between processor implementations, and program code may reference that register when controlling program code loops to vary how much data is processed per loop iteration depending on the vector length MVL implemented. Hence, a program with a given amount of data to process could process that data using fewer loop iterations on a micro-architecture implementing a longer vector length than on a micro-architecture implementing a shorter length, but in both cases perform the same functional processing operations to generate the same computation results (although with different levels of performance).

The immediate value may represent which sub-portion of the 2D array is to be transferred. As the number of elements that can fit within a vector register increases as the vector length MVL increases, one might think that (to allow the other dimension of the 2D array to scale similarly), the immediate value should be provided with a sufficient number of bits to be able to distinguish a number of vector registers corresponding to the number of elements that can fit within one vector register when the maximum vector length $MVL_{max}$ is implemented.

However, the inventors recognised that, in practice, if the number of distinct encodings for the immediate value is greater than $MVL_{min}/E$ (the number of elements within a vector register of the minimum vector length $MVL_{min}$ supported by the ISA), this would mean that the program code would not be vector length agnostic, as instructions specifying an index greater than $MVL_{min}/E$ could not operate correctly on a micro-architecture implementing the minimum vector length $MVL_{min}$. Therefore, in ISAs designed for vector length agnosticism, it is not worth expending additional bits of instruction encoding to provide larger immediate values. By limiting the number of bits of the immediate value encoding such that the number of distinct encodings is less than or equal to $MVL_{min}/E$, this frees up encoding bit space for other parameters, and improves support for vector length agnosticism.

Of course, if the data transfer instruction described above is implemented in an ISA for which vector length agnosticism is not a priority, then it would still be possible to support larger values of the immediate value.

In some examples, the index value generated based on the base value and the immediate value of the register addressing information may be the only item of register identification information used to select the target portion of the register storage for which the data transfer is to be performed. For example the index value could specify a register identifier of an individual vector register within the 2D array register storage described above. In this approach, although a group of vector registers as a whole may be considered to form a 2D array of data such as a matrix, the instructions may reference individual horizontal/vertical groups of elements of the array by specifying the specific register identifier of a vector register used to store that group of elements.

However, certain programming techniques require the processing of multiple 2D arrays rather than individual horizontal/vertical groups of elements. Therefore, another approach may be that the 2D array register storage is capable of being logically partitioned into at least two array storage regions, with each array storage regions storing a respective 2D array. The register addressing information may, in addition to the index value, also include an array identifier identifying a selected array storage region of the 2D array register storage. In this case, the index value may identify which sub-portion of the selected array storage region is the target portion of the register storage. Hence, the data transfer instruction may specify the array ID of an array to be accessed for data transfer, and the index value defined using the base register and immediate may be used to select an individual horizontal/vertical group of elements from that array. This approach can make it simpler for software to define program loops which loop over each horizontal/vertical group of elements in the array to transfer the 2D array to/from the register storage.

In some implementations, the partitioning of the 2D array register storage into array storage regions may be fixed, so that a given array identifier always corresponds to a certain fixed portion of the 2D array register storage. For example, when the 2D array register storage is implemented using a set of vector registers as discussed above, each array storage region could correspond to a fixed block of vector registers.

However, in implementations which support variable data element sizes as discussed above, it can be useful for the partitioning of the 2D array register storage into array storage regions to use a variable mapping which depends on the current data element size. The processing circuitry may identify which portion of the 2D array register storage is the array storage region corresponding to a given value of the array identifier based on a variable mapping which depends on the current data element size E specified for the data transfer operation. This may help to improve performance by improving the efficiency of utilisation of available register capacity implemented in hardware.

As mentioned above, when the data element size E is variable, then this means that a single register can store a variable number of data elements, but it may be desirable for the second dimension of the array to scale in a similar manner, so that if a greater number of elements fit within one vector register (representing either the horizontal or vertical direction), the array also spans a greater number of vector registers (representing the dimension of the array in the other of the horizontal/vertical direction). If a greater number of vector registers is allocated for representing a single 2D array structure, this means that fewer 2D arrays in total may be accommodated within the available register storage capacity of the 2D array register storage as a whole. On the other hand, when the data element size becomes larger then each vector register may store fewer data elements in the first dimension of the array, and so fewer vector registers are needed to accommodate the other dimension of the array, allowing a greater number of distinct 2D arrays to fit within the available hardware storage capacity. If a fixed mapping between array identifiers and array storage regions was used, then each storage region would have to be sufficiently large to store a 2D array at the minimum data element size, which would waste storage capacity in cases where a larger elements size was used. By using a variable mapping between the array identifier and array storage regions as described above, the partitioning can be adjusted to make full use of the available register capacity, which can help to improve performance because when more arrays can fit within the register storage then the number of (slower) load/store instructions executed per computation instruction can be reduced.

In one example the 2D array register storage may be logically partitioned into a certain number $N_A$ of array storage regions and $N_A$ may vary depending on the current data element size E, with $N_A$ increasing as E increases. This relationship may be seen as counter-intuitive since normally (with vector processing) one would expect a number of partitions to decrease as the data element size increases. However, with 2D array processing, although the number of elements which fit within a single register in a first dimension decreases as the element size E increases, in the second dimension in which elements are striped across vector registers, each element requires a single vector register regardless of its element size, so the number of vector registers used for a single 2D array in the second dimensions actually decreases with increasing element size. Therefore, the total number of array storage regions ($N_A$) which can fit in a certain amount of physical storage may increase as the element size increases.

As there are fewer array storage regions to distinguish at smaller element size than at larger element size, the array identifier encoded by the data transfer instruction can also have a variable number of bits which depends on the current data element size E. However, the number of bits which are needed for the array identifier may have the opposite relationship with the current data element size E compared to the relationship for the immediate value as discussed earlier. The array identifier may have a greater number of bits at larger data element sizes than at smaller data element sizes, while the immediate value may have a greater number of bits at smaller data element sizes than at larger data element sizes.

Hence, while some implementations of the data transfer instruction could encode the array identifier and the immediate value with two distinct non-shared fields within the instruction encoding, one particularly efficient encoding can be that the array identifier and the immediate value are encoded using a shared portion of bits of the instruction encoding of the data transfer instruction. For a given bit within that shared portion, the instruction decoding circuitry varies, depending on the current data element size E specified for the data transfer instruction, whether the given bit is interpreted as indicating part of the array identifier or indicating part of the immediate value. This this can help to reduce the total number of bits needed to represent both the array identifier and immediate value, freeing up other bits of the instruction encoding for other purposes. This can be extremely valuable in ISA design because encoding space is typically at a premium.

In some examples a total number of bits of the instruction encoding of the data transfer instruction which are used to encode the array identifier and the immediate value may be constant regardless of the current data element size E.

In some examples, the data transfer instruction may be a load/store instruction specifying the register addressing information and memory addressing information for identifying a target portion of memory, for which the data transfer operation comprises transferring data between the target portion of the register storage and the target portion of memory. In this case, the memory addressing information may be defined according to any known memory addressing mode (e.g. using a base register and an offset register, or a base register and an immediate value, to define the memory address(es) to be accessed).

Also, the data transfer instruction may be a register move instruction specifying the register addressing information and further register addressing information for identifying a further portion of the register storage, and the data transfer operation may comprise transferring data between the target portion of the register storage and the further portion of the register storage. In this case, while the target portion of the register storage may be identified using a base register identifier as described earlier, the further addressing information need not comprise a base register identifier. For example, the further addressing information could simply be a register identifier directly specifying the register to be accessed as the further portion of the register storage. For example, in examples where the target portion of the register storage is a portion of the 2D array register storage mentioned earlier, the further portion of the register storage could be a vector register.

Hence, the data transfer instruction could either be used to transfer data between the register storage and memory, or to transfer data between respective portions of the register storage. Some ISAs may only support one of the load/store instruction and the register move instruction using a base register identifier and immediate value as part of the register addressing information (with the other type of instruction not using the base register identifier and immediate based addressing). Other ISAs may support both a load/store instruction and a register move instruction using register addressing information comprising the base register identifier and the immediate value.

It will be appreciated that the data transfer instruction which comprises the register addressing information including the base register identifier and the immediate value may not be the only type of data transfer instruction supported in the ISA implemented by the instruction decoding circuitry and processing circuitry. There could also be other types of data transfer instructions which do not use a base register identifier and the immediate value to define an index used to select a portion of register storage to access in the data transfer.

The base register identified for the register addressing information may be a scalar register. A scalar register is a register intended to store a single data value (as opposed to a vector register which can be partitioned into multiple independent data elements with each data element representing a distinct data value).

In some implementations, scalar registers may be selected from among a certain pool of scalar registers which are available for selection by instructions. For example scalar computation instructions may have a K-bit scalar register field for specifying, as a source or destination register of the instruction, the particular scalar register which is to store an operand for the instruction or the result of the instruction. With K-bit scalar register fields, this may allow the system to support a 2K different scalar registers.

In some implementations, if the number of distinct scalar registers supported in the ISA is 2K, the number of bits used for the base register field of the register addressing information may be K bits, so that any of the supported scalar registers can be selected as the base register.

However, in other examples, the data transfer instruction may specify the base register using an L-bit scalar register field, where L<K so that at least one scalar register specifiable as the source or destination register for at least one scalar computation instruction is incapable of being specified as the base register of the register addressing information for the data transfer instruction. That is, the base register field is a compressed field which is shorter than the number of bits that would be needed to allow selection of any scalar register supported in the architecture. This can help to free up bits of instruction encoding for other purposes. In practice, restricting the base register to be selected from a limited subset of scalar registers can be sufficient to deal with expected use cases for applications such as matrix processing.

The instruction decoding circuitry may support a 2D-array-generating computation instruction, in response to which the instruction decoding circuitry controls the processing circuitry to perform a computation operation to generate a 2D array of result values to be written to the 2D array register storage. The 2D array of result values may be generated in response to a single instance of the 2D-array-generating computation instruction. In systems which can support generation of a 2D array of values in response to a single instruction, processing throughput can be much greater than implementations where vector processing is used to process a single 1D array of data at a time. This can be particularly useful for applications such as machine learning and signal processing, etc. as discussed above. For example the computation operation could be a matrix multiplication operation where the input operands for the computation are 2D arrays of data and the result is a 2D array which represents the result of multiplying the matrices represented by the 2D array operands. However, in other examples the computation operation may comprise an outer product operation performed on first and second vector operands to generate the 2D array of result values. Implementing an outer product operation may be simpler in hardware than a full matrix multiplication. Accumulating results of a sequence of outer product operations can generate an equivalent result to a matrix multiplication. Hence, the computation instruction could be an outer-product-and-accumulate instruction which, as well as generating an outer product of two vectors, also adds the resulting elements to an accumulator 2D array of elements (e.g. stored in one of the 2D array storage regions of the register storage mentioned above). The data transfer instruction of the type discussed above is particularly useful for systems supporting such 2D-array-generating computation instructions, because it allows efficient access to individual horizontal/vertical groups of elements of a 2D array register. The encoding of the data transfer instruction permits such accesses to be unrolled by compilers and scheduled while still being able to dynamically adapt to a scalable array size.

The techniques discussed above may be implemented within a data processing apparatus which has hardware circuitry provided for implementing the instruction decoder and processing circuitry discussed above.

However, the same technique can also be implemented within a computer program which executes on a host data processing apparatus to provide an instruction execution environment for execution of target code. Such a computer program may control the host data processing apparatus to simulate the architectural environment which would be provided on a target data processing apparatus which actually supports target code according to a certain ISA, even if the host data processing apparatus itself does not support that architecture. Such simulation programs are useful, for example, when legacy code written for one ISA is being executed on a host processor which supports a different ISA. Also, the simulation can allow software development for a newer version of the ISA to start before processing hardware supporting that new architecture version is ready, as the execution of the software on the simulated execution environment can enable testing of the software in parallel with ongoing development of the hardware devices supporting the new architecture. The simulation program may be stored on a storage medium, which may be an non-transitory storage medium.

Hence, the computer program may comprise instruction decoding program logic which decodes program instructions of the target code to control the host data processing apparatus to perform data processing in response to the program instructions (e.g. mapping each instruction of the target code to a sequence of one or more instructions in the native instruction set of the host which implements equivalent functionality). Also, the computer program may have register emulating program logic which maintains a data structure in host storage of the host data processing apparatus (e.g. in registers or memory of the host) to emulate the register storage of the target ISA being simulated, which one would expect to be provided in hardware in a processor actually supporting the target ISA.

In such an implementation, the instruction decoding program logic may support a data transfer instruction having the same register addressing information as discussed above, but in this case references to the register storage based on the register addressing information are mapped by the register emulating data structure to corresponding locations of the register emulating data structure stored in the host storage. Hence, the base register identifier and immediate value may be used to identify which portion of the emulated registers is to be accessed in the data transfer for the data transfer instruction whose execution on the target processing apparatus is being simulated on the host apparatus.

FIG. 1 schematically illustrates an example of a data processing apparatus 20. The data processing apparatus has a processing pipeline 24 which includes a number of pipeline stages. In this example, the pipeline stages include a fetch stage 26 for fetching instructions from an instruction cache 28; a decode stage 30 (instruction decoding circuitry) for decoding the fetched program instructions to generate micro-operations to be processed by remaining stages of the pipeline; an issue stage 32 for checking whether operands required for the micro-operations are available in a register file 34 and issuing micro-operations for execution once the required operands for a given micro-operation are available; an execute stage 36 (processing circuitry) for executing data processing operations corresponding to the micro-operations, by processing operands read from the register file 34 to generate result values; and a writeback stage 38 for writing the results of the processing back to the register file 34. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 34.

The execute stage 36 includes a number of processing units, for executing different classes of processing operation. For example the execution units may include a scalar arithmetic/logic unit (ALU) 40 for performing arithmetic or logical operations on scalar operands read from the registers 34; a floating point unit 42 for performing operations on floating-point values; a branch unit 44 for evaluating the outcome of branch operations and adjusting the program counter which represents the current point of execution accordingly; a matrix processing unit 46 for matrix processing (which will be discussed in more detail below); and a load/store unit 48 for performing load/store operations to access data in a memory system 50, 52, 54.

In this example, the memory system includes a level one data cache 50, a shared level two cache 52 and main system memory 54. It will be appreciated that this is just one example of a possible memory hierarchy and other arrangements of caches can be provided. The specific types of processing unit 40 to 48 shown in the execute stage 36 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

In some implementations the data processing apparatus 20 may be a multi-processor apparatus which comprises a number of CPUs (central processing units, or processor cores) 60 each having a processing pipeline 24 similar to the one shown for one of the CPUs 60 of FIG. 1. Also the apparatus 20 could include at least one graphics processing unit (GPU) 62, and/or other master devices 64 which may communicate with one another and with the CPUs via an interconnect 66 used to access memory 54.

One approach for supporting matrix processing operations can be to decompose the individual multiplications of a given matrix processing operation into separate scalar integer or floating-point instructions which can be processed on the processing pipeline 24 of a given CPU 60. However, this may be relatively slow.

Another approach to accelerating matrix processing can be to provide, as one of the devices 64 connected to the interconnect 66, a hardware accelerator with dedicated hardware designed for handling matrix operations. To interact with such a hardware accelerator, the CPU 24 would execute load/store instructions using the load/store unit 48, to write configuration data to memory 54 (or to memory mapped registers within the hardware accelerator) defining the matrix operands to be read from memory by the hardware accelerator and defining the processing operations to be applied to the operands. Once the hardware accelerator has performed the matrix processing, the CPU 60 can then read the results of the matrix processing back from the hardware accelerator using a load instruction specifying an address mapped to registers within the hardware accelerator. While this approach can be faster than using integer operations within the pipeline, there may nevertheless be an overhead associated with using the load/store mechanism to transfer information between the general purpose processor 60 and the hardware accelerator 64, and also the hardware accelerator approach can create challenges when different virtual machines running on the same processing system need to share access to the hardware accelerator. Therefore, this approach may not scale well in a virtualised implementation having a number of virtual machines.

Therefore, as shown in FIG. 1, it is possible to provide matrix processing circuitry 46 within the regular processing pipeline 24 of a given CPU 60 which can be controlled to perform matrix processing in response to computation program instructions decoded by the decode stage 30 of the pipeline (similar to controlling regular integer or floating point arithmetic operations using the ALU 40 or the floating point unit 42). This avoids the need to transfer data backwards and forwards between the CPU 60 and the hardware accelerator and makes it much simpler to allow a number of different virtual machines to perform matrix operations.

While FIG. 1 shows a multi-processor apparatus 20 having several CPUs 60, this is not essential and the matrix processing circuitry 46 could also be implemented in a single-core system.

In the example of FIG. 1, matrix processing functionality is provided within the CPU 60 itself.

Figure 2A:
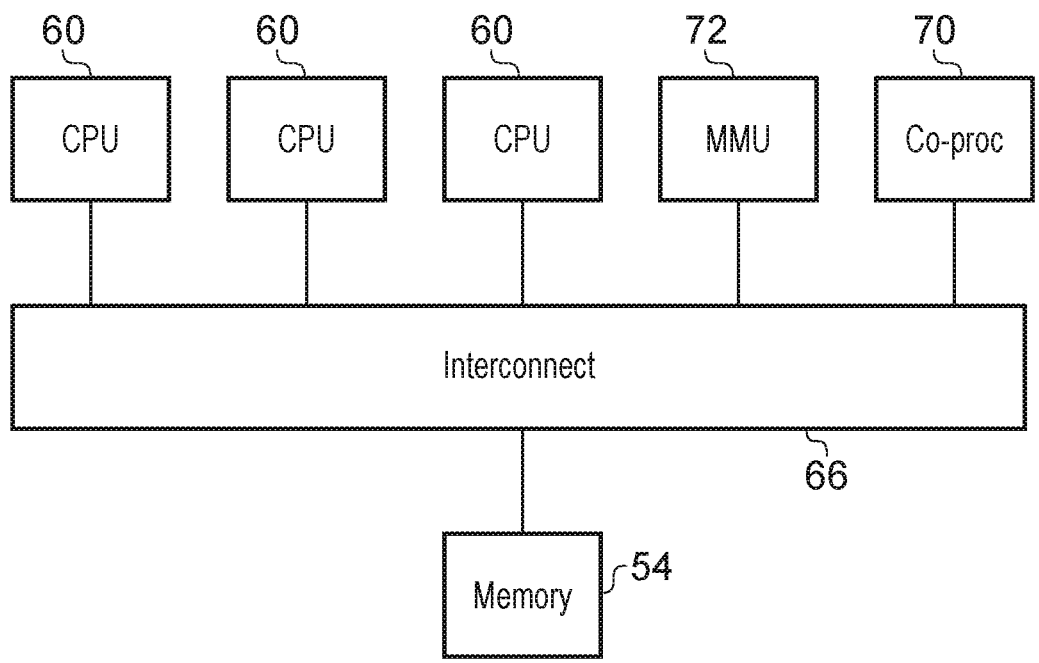
FIGS. 2A-2D show a second example of a data processing apparatus supporting matrix processing.
Figure 2B:
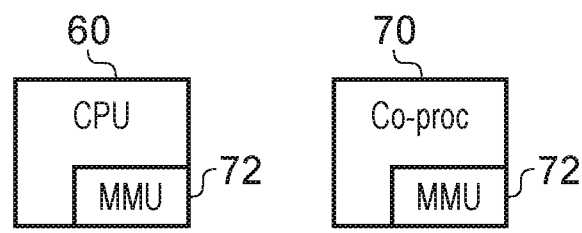

FIGS. 2A to 2D show a second example of a data processing apparatus, in which each CPU 60 does not itself have the matrix processing functionality, but matrix processing is supported in a co-processor 70 which is connected to the CPUs 60 via the interconnect 66. This approach can be useful to reduce the hardware cost of implementing matrix processing functionality, as the hardware resources used for supporting matrix processing in the co-processor 70 can be shared among the CPUs 60. To allow the co-processor 70 to access memory using corresponding address translation data to the address translation data used by the CPU 60 itself, a memory management unit (MMU) 72 may be provided, either as a distinct block shared between the CPUs 60 and co-processor 70 as shown in FIG. 2A, or with each CPU 60 and the co-processor 70 having its own MMU 72 as shown in FIG. 2B which can be loaded with address translation data from a common set of page tables in memory. Note that, although not shown in FIG. 1 for conciseness, in that example it is also possible for the CPU 60 to have an internal MMU 72. Also, in some examples, it would be possible for translations of addresses used for co-processor load/store operations to be performed by the MMU in the CPU 60 and the resulting physical address passed to the co-processor 70 along with the load/store instruction.

The MMU 72 translates virtual addresses identified based on memory addressing information specified by program instructions to physical addresses identifying locations to access in memory 54. The MMU 72 may also implement permission checks to check whether program code is allowed to access a given memory address.

Figure 2C:
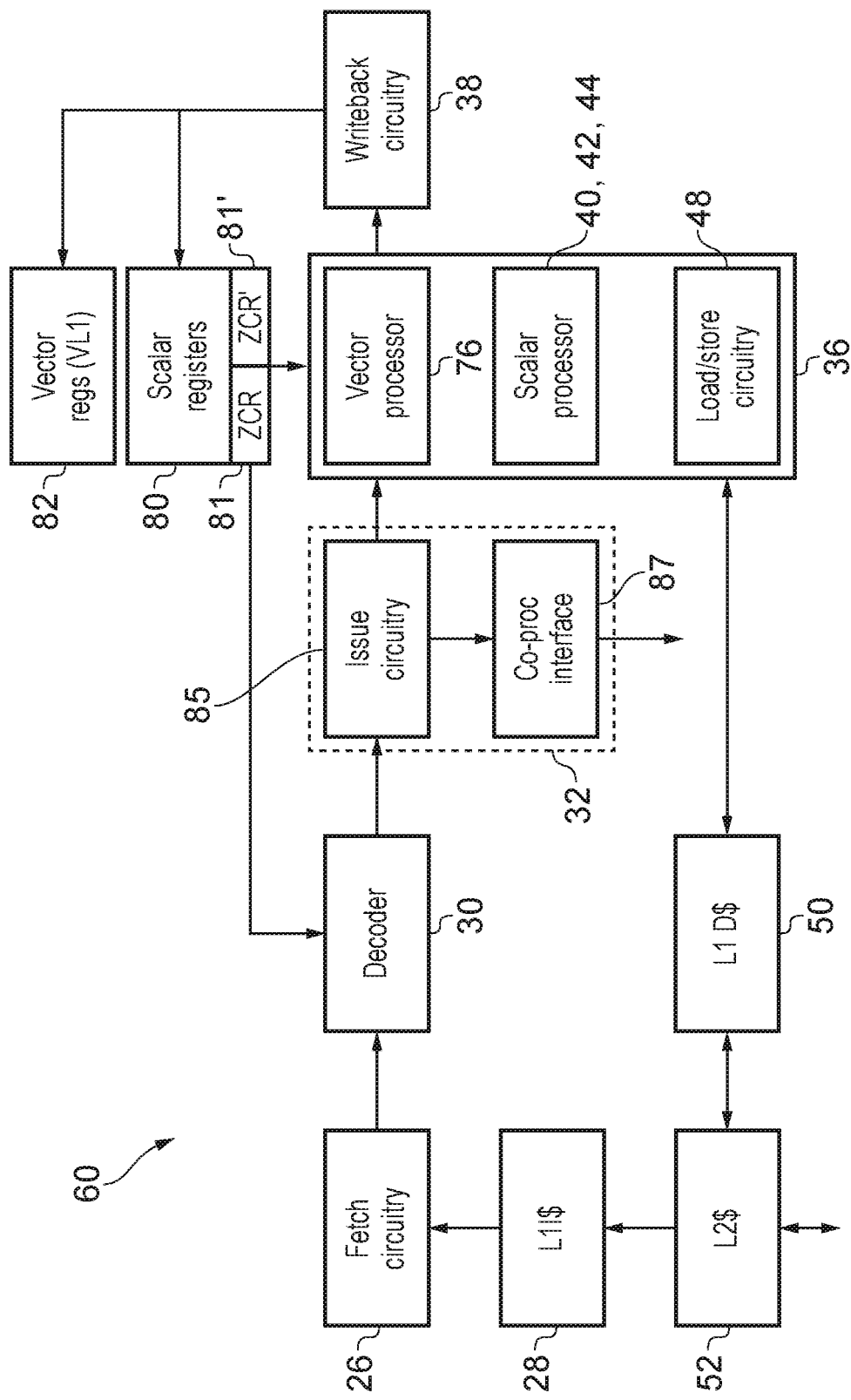

FIG. 2C shows the CPU 60 in the example of FIG. 2A/2B. The elements that are the same as in FIG. 1 are indicated with the same reference numerals. In this example, the scalar execution units 40, 42, 44 shown in FIG. 1 are collectively referenced as scalar processing circuitry, which perform operations on scalar operands stored in scalar registers 80. The execute stage 36 also includes vector processing circuitry 76 for performing vector processing operations on vector operands stored in vector registers 82. Although the vector processing circuitry 76 and vector registers 82 were not shown in FIG. 1, they can also be provided in that example.

In the example of FIGS. 2A-2D, the processing apparatus supports processing of a program in either a non-matrix processing mode or a matrix-processing mode. Instructions processed in the non-matrix processing mode are issued by issue circuitry 85 of the issue stage 32 of the CPU 60, for execution by the processing units in the execute stage 36.

Figure 2D:
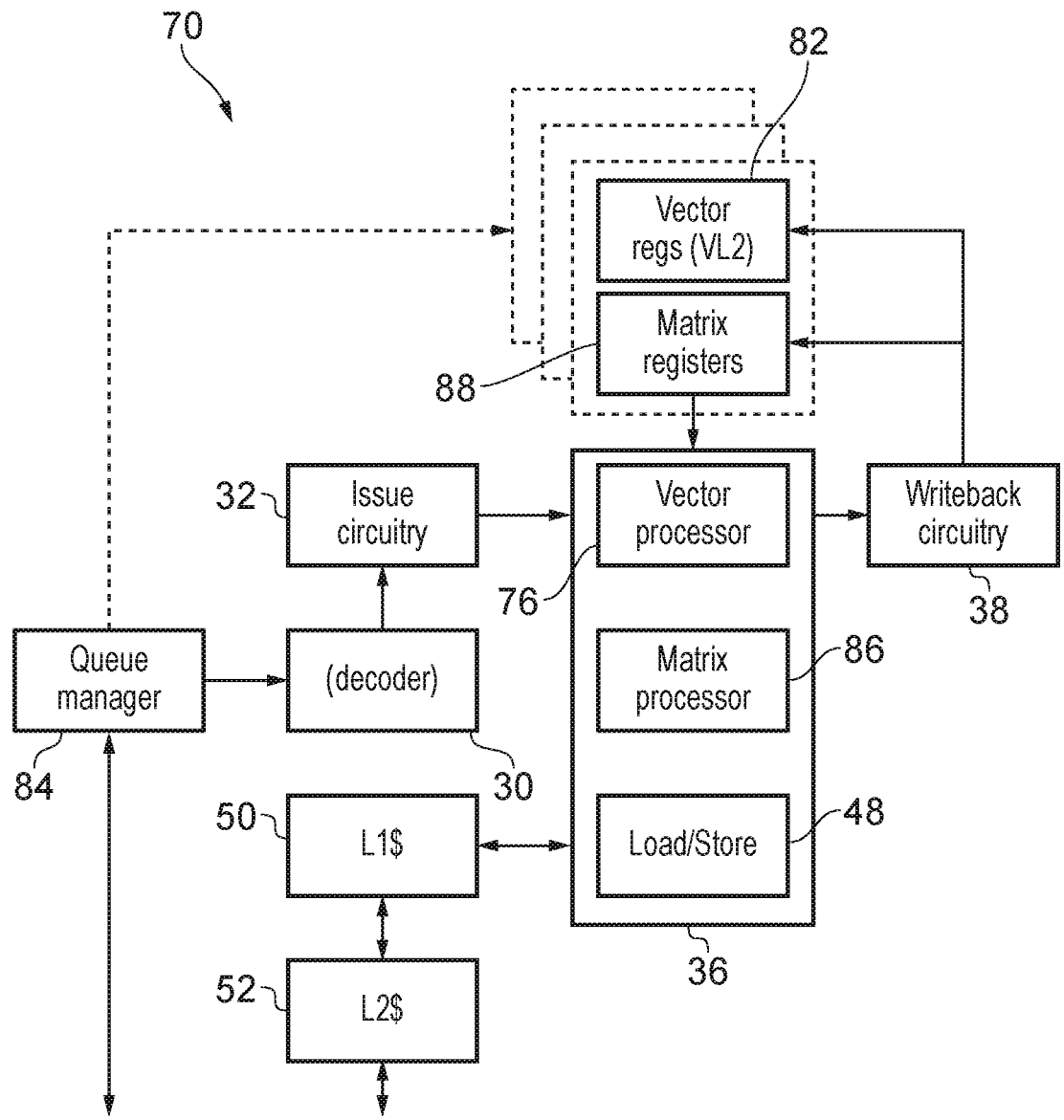

However, instructions processed in the matrix processing mode are forwarded by a co-processor interface 87 of the CPU 60's issue stage 32, to a queue manager 84 in the co-processor 70 (as shown in FIG. 2D). The queue manager 84 passes the instructions to a pipeline within the co-processor 70 comprising instruction decoding circuitry 30, issue circuitry 32, an execute stage 36 and writeback circuitry 38 similar to the CPU 60, however the pipeline in the co-processor 70 may support a different subset of instructions of the ISA compared to the CPU 60. For example, the co-processor 70 may support a more limited set of instructions than the CPU 60, to limit the complexity of the co-processor while supporting operations expected to be useful for matrix processing.

The CPU 60 in this example does not support any matrix processing computation instructions, which are instead supported by a matrix processing execution unit 86 in the co-processor 70. Selection of whether a program is currently executing in the matrix processing mode or non-matrix processing mode may be made based on certain mode controlling instructions which enable/disable the matrix processing mode.

To support matrix processing, the co-processor 70 has matrix registers (2D array registers) 88 which are designated for storing 2D arrays (matrices) of data. Data transfer instructions which transfer portions of matrices between the matrix registers 88 and memory 54, or between matrix registers 88 and other types of register (such as vector registers 82) are limited to execute in the matrix processing mode. Although not shown in FIG. 1, in the embodiment where the CPU itself supports matrix processing the CPU 60 may similarly have matrix registers 88 within its registers 34.

The vector length of the vector registers 82 in the co-processor 70 may not be the same as the vector registers 82 in the CPU 60. As matrix processing operations may be more efficient at greater vector lengths (to enable greater data throughput), in some cases a processor designer may wish to select a longer vector length VL2 for the vector registers 82 (and vector registers used to provide the matrix registers 88 of the co-processor) than the vector length VL1 used for the vector registers 82 in the CPU 60. Nevertheless, the ISA may support variable vector lengths VL1, VL2 for the non-matrix processing and matrix processing modes, both of which can be selected for a given hardware implementation from among a range of vector lengths supported by the ISA (in some cases the range available for selection as VL1 may not be the same as the range available for selection as VL2, although the ranges may overlap and so it may be possible for a particular implementation to select VL1=VL2). Vector control registers (ZCR, ZCR') 81, 81' may be provided in the CPU 60 to indicate the respective vector lengths VL1, VL2 used in the non-matrix-processing and matrix-processing modes respectively.

The program code defined according to the ISA may function in an equivalent manner on both hardware implementations (either FIG. 1 with matrix processing implemented within the CPU 60, or the co-processor example of FIGS. 2A-2D). If executed on an implementation as shown in FIG. 1, mode selection instructions may be treated as no-operation instructions, and it may be that the vector length implemented for any vector registers may be the same in both modes (as the same registers are used in both modes). If executed on an implementation as shown in FIGS. 2A-2D, the mode selection instructions may signal that instructions should be forwarded for execution to the co-processor, and it may be useful to support different vector lengths VL1, VL2 in the two modes. Either way, from the perspective of the software developer, the matrix processing is performed by the matrix processing logic 46, 86 in response to regular CPU instructions (computation/arithmetic instructions) which define register-to-register operations acting on operands stored in registers and generating results written back to a register, which makes control of matrix processing much more straightforward than in implementations which use a hardware processor controlled based on load/store instructions to perform the matrix processing, which may require specialised software drivers to implement the matrix processing. Of course, even in a system comprising a CPU 60 or co-processor with ISA support for register-to-register computation instructions implementing matrix processing, it is still possible to provide a dedicated hardware accelerator as a device 64 accessible via the interconnect 66 using load/store instructions, to provide additional support for forms of matrix processing not supported in register-to-register computation instructions of the ISA. However, such a hardware accelerator is not essential.

Figure 3:
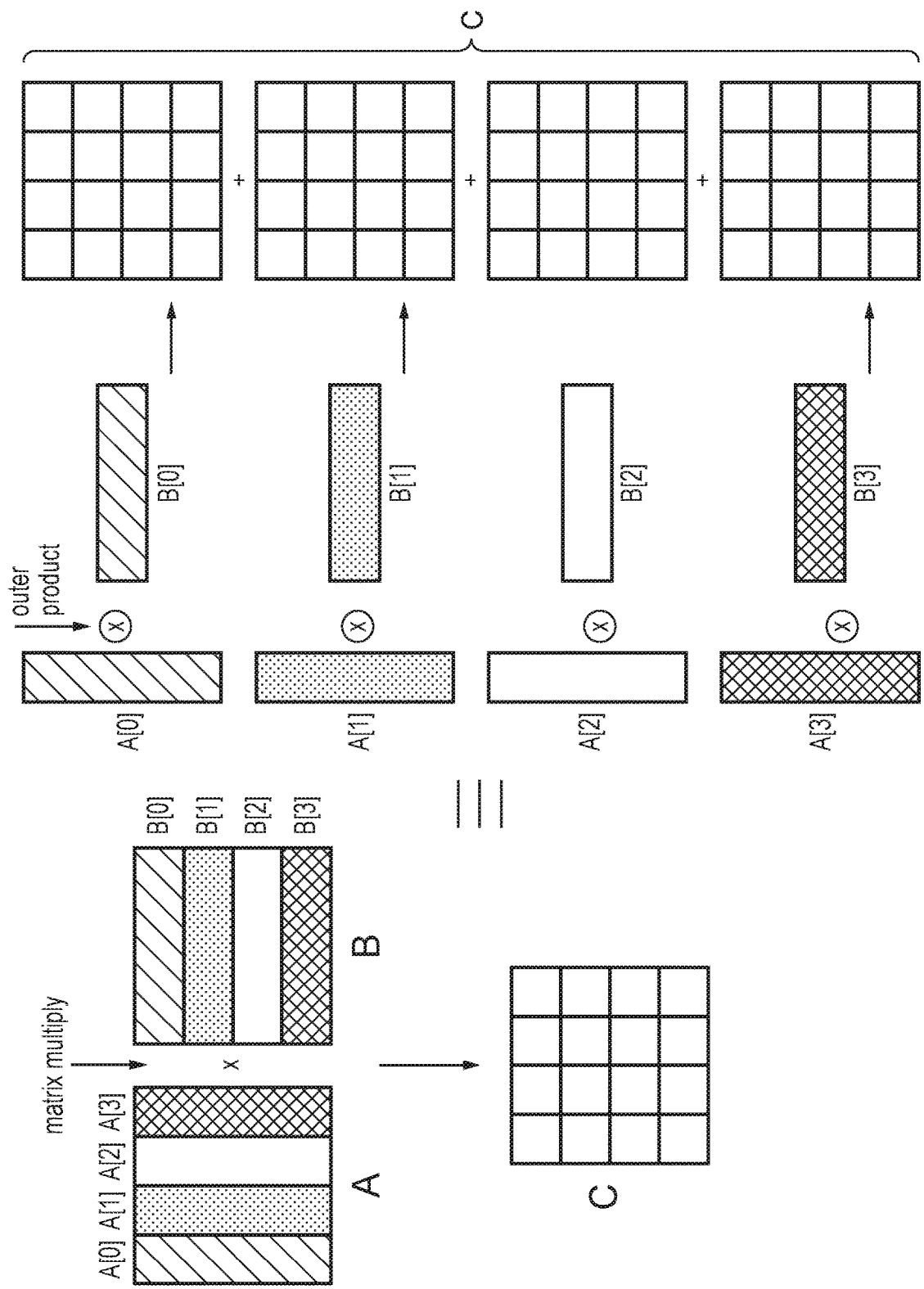
FIG. 3 illustrates how a matrix multiplication operation can be split into outer product operations to generate an equivalent result.

FIG. 3 shows an example of a matrix multiplication between a first matrix A and a second matrix B to generate a result matrix C. In this example the matrices are all square matrices, of dimensions 4×4 for the particular example, although this is not essential. For a matrix multiplication operation C=AB, where A is an m×n matrix and B is an n×p matrix, then C is an m×p matrix where a given element at position (i, j) of C corresponds to the result of adding pair wise products of elements of the $i^{th}$ row of matrix A and the $j^{th}$ column of matrix B, so that a given element $c_{ij}$ of the result matrix corresponds to $\Sigma_{k=1}^{n} a_{ik} b_{kj}$.

As shown on the right hand side of FIG. 3, it is possible to generate an equivalent result by performing a series of outer product operations. An outer product operation takes a first vector operand $u=(u_1, u_2, \ldots, u_m)$ and a second vector operand $v=(v_1, v_2, \ldots, v_n)$ each comprising a one-dimensional array of elements and combines these to form a two-dimensional result matrix W where $$W = \begin{bmatrix} u_1 v_1 & \cdots & u_1 v_n \\ \vdots & \ddots & \vdots \\ u_m v_1 & \cdots & u_m v_n \end{bmatrix}.$$

Hence, each element of the outer product result matrix is derived from a single multiplication of one element of the input vector operand with one element of the second vector operand. As shown in FIG. 3, if the elements of matrix A are read out in columns (rather than in rows as for the matrix multiply described above) and the elements of the second matrix B are read out in rows (rather than in columns as would be done for the matrix multiply), then by performing an outer product operation on the $i^{th}$ column of matrix A and the $i^{th}$ row of matrix B, and accumulating the results for i=1 to n, the result is equivalent to the result of the matrix multiply operation. Splitting a matrix multiply operation into separate outer product operations can be useful to reduce the number of products and additions needed to be calculated in response to a single program instruction. This is a faster operation and can be simpler to design in hardware while designing circuit logic whose timings fit with pipeline timings of other operations within a processor. In any case, an outer product is also an important operation in its own right for certain algorithms, so can be used for purposes other than implementing matrix multiplication.

Figure 4:
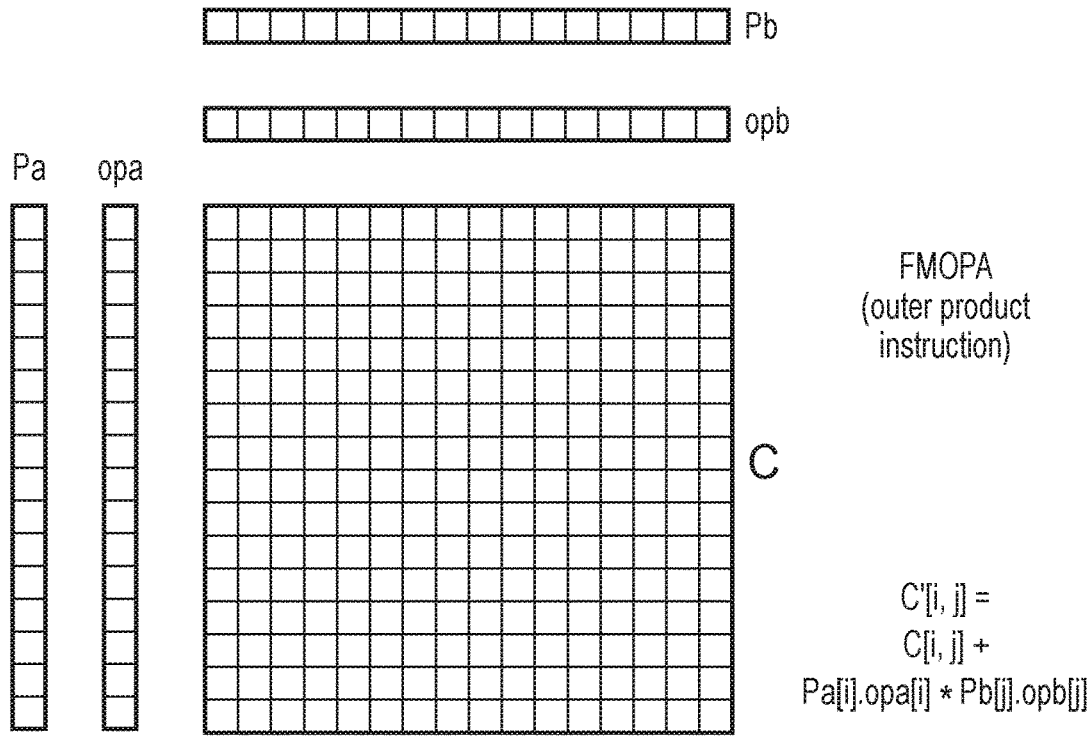
FIG. 4 shows an example of an outer product engine for performing the outer product operation on a pair of vector operands to generate a two-dimensional (2D) array of data as a result.

Therefore, in some examples the matrix processing unit 46, 88 of the processing circuitry (in either of the examples of FIGS. 1 and 2A-2D) may comprise an outer product engine as shown in FIG. 4 for performing outer product operations. The outer product engine takes as inputs a first vector operand opa which is associated with a first predicate value Pa, and a second vector operand opb which is associated with a second predicate value Pb. The result output by the outer product engine is a 2D array (matrix) C'. The result matrix may be stored to 2D array register storage which is provided for storing 2D arrays (e.g. the matrix registers 88 shown in FIG. 2D, which in the example of FIG. 1 would also be provided within registers 34). A previous value stored in each element of the result array storage C may also serve as an input to the operation so as to perform an outer-product- and accumulate operation for which a given element C'[i, j] is generated according to the equation shown in FIG. 4, where Pa[i].opa[i] indicates that element i of opa is predicated by element i of Pa, and Pb[j].opb[j] indicates that element j of opb is predicated by element j of Pa. For an outer product instruction implementing merging predication, when a predicate element Pa[i] or Pb[j] is indicated as being inactive, the corresponding element C'[i, j] will retain its previous value. It is also possible to implement zeroing predication where elements C'[i,j] of the result matrix which correspond to an inactive predicate element Pa[i] or Pb[j] are set to 0, overwriting the previous value C[i,j] for that element position. Predication can be useful when matrix processing reaches the edge of a matrix structure and the number of elements to process are not sufficient to fill the entire matrix supported in the hardware, for example. Outer product and accumulate operations as shown in FIG. 4 are useful as they simplify implementation of hardware support for matrix multiplication operations, and the accumulation means it is not necessary to store each outer product result separately and then add them as a final step. However, the outer product engine shown in FIG. 4 is just one example, and in other implementations of a matrix processing engine 46, 88 it would be possible to provide support for performing a full matrix processing operation in one instruction. However, as discussed above outer product operations may be easier to implement in practice.

Figure 5:
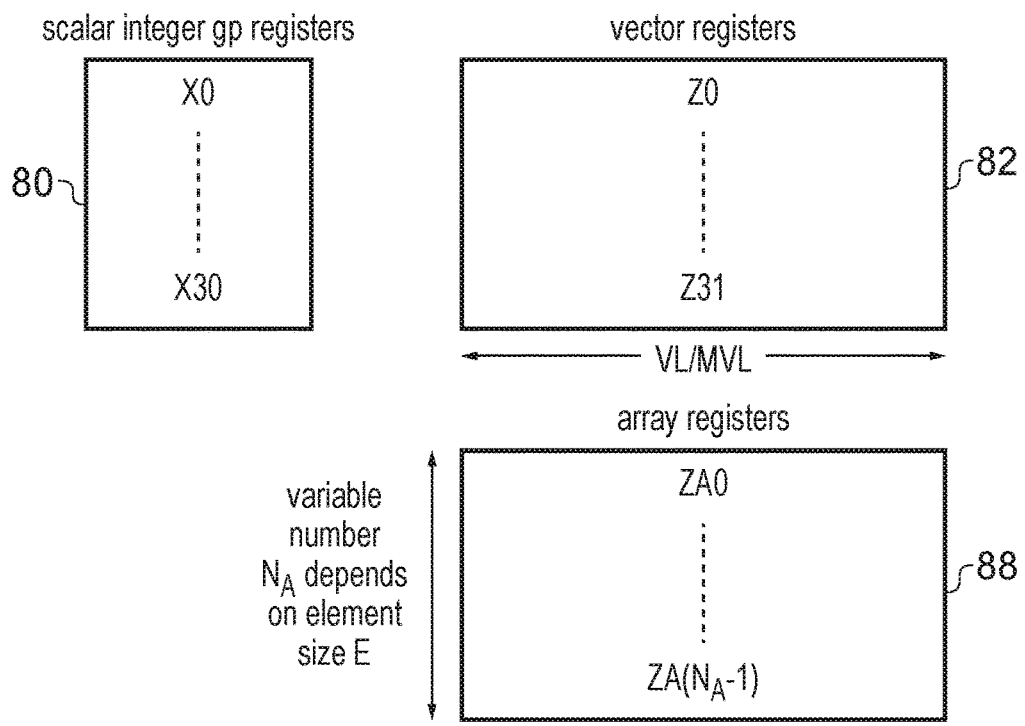
FIG. 5 shows an example of architectural registers of the processing apparatus, including vector registers for storing vector operands and array registers for storing 2D arrays of data.

FIG. 5 shows an example of the architectural registers 34 of the CPU 60 or the co-processor for supporting matrix operations. The architectural registers (as defined in the ISA) may include a set of scalar integer registers which act as general purpose registers for ALU operations performed by the ALU 40 or other instructions processed in the pipeline. For example there may be a certain number of general purpose registers provided, for example 31 registers X0-X30 in this example (the $32^{nd}$ encoding of a scalar register field may not correspond to a register provided in hardware, as it may be considered by default to indicate a value of zero, for example, or could be used to indicate a dedicated type of register which is not a general purpose register). It may be possible to access scalar registers of different sizes mapped to the same physical storage. For example, the register labels X0-X30 may refer to 64-bit registers, but the same registers could also be accessed as 32-bit registers (e.g. accessed using the lower 32 bits of each 64 bit register provided in hardware), in which case register labels W0-W30 may be used in assembler code to reference the same registers.

Also, the architectural registers available for selection by program instructions in the ISA supported by the decoder 30 may include a certain number of vector registers 82 (labelled Z0-Z31 in this example). Of course, it is not essential to provide the number of scalar/vector registers shown in FIG. 5, and other examples may provide a different number of registers specifiable by program instructions. Each vector register may store a vector operand comprising a variable number of data elements where each data element may represent an independent data value. In response to vector processing (SIMD) instructions, the processing circuitry may perform vector processing on vector operands stored in the registers to generate results. For example the vector processing may include lane-by-lane operations where a corresponding operation is performed on each lane of elements in one or more operand vectors to generate corresponding results for elements of a result vector. When performing vector or SIMD processing, each vector register may have a certain vector length VL where the vector length refers to the number of bits in a given vector register (for example the vector length VL for vector instructions may be the first vector length VL1 mentioned earlier with respect to FIGS. 2A-2D). The vector length VL used in vector processing mode may be fixed for a given hardware implementation or could be variable. The ISA supported by the CPU 60 may support variable vector lengths so that different processor implementations may choose to implement different sized vector registers but the ISA may be vector length agnostic so that the instructions are designed so that code can function correctly regardless of the particular vector length implemented on a given CPU executing that program. For example there may be a control register (e.g. ZCR 81) which stores a value indicating the particular vector length VL used for vector processing instructions. This register can be read by software to control loops which iterate through processing of a certain number of elements so that implementations with longer vector length may process a given number of elements in fewer iterations of the loop than implementations with shorter vector length.

The vector registers Z0-Z31 may also serve as operand registers for storing the vector operands which provide the inputs to an outer product operation performed by the outer product engine 48, 86 as discussed above with respect to FIG. 4. When the vector registers are used to provide inputs to an outer product operation or other matrix operation, then the vector registers have a matrix vector length MVL, which may be the same as the vector length VL used for vector operations, or could be a different vector length (e.g. VL2 instead of VL1, as discussed above for the modal functionality in an embodiment using a co-processor 70). By providing the architectural support at an ISA level to support different vector lengths for SIMD operations and matrix operations, this can provide more flexibility for the processor micro-architect to choose different physical implementations, including the option of implementing the matrix operations using a co-processor 70 as discussed above. The ISA may support mode selection instructions which may select whether the processor is operating in a matrix processing mode or a non-matrix processing mode and this can be useful for configuring the CPU to offload processing to the co-processor if implemented. In this case the mode selection instructions may, among other functions, also trigger a switch of the current vector length implemented, selecting one of VL and MVL depending on the current mode. The vector control registers 81, 81' may be provided to indicate the particular vector lengths used as VL and MVL for the respective modes.

Hence, in general the vector length MVL discussed for subsequent examples is the vector length used in the matrix processing mode, which may or may not be the same as the vector length VL used in other modes. A control register may store a value indicating what the matrix vector length MVL is for the current processor implementation, which could be made available to software so as to control program loops.

As shown in FIG. 5, the architectural registers also include a certain number $N_A$ of array registers 88, ZA0-ZA($N_A$-1). Each array register can be seen as a set of register storage for storing a single 2D array of data, e.g. the result of an outer product operation as discussed above. However, outer product operations may not be the only operations which can use the array registers. The array registers could also be used to store arrays while performing transposition of the row/column direction of a matrix structure in memory. When a program instruction references one of the array registers 88, it is referenced as a single entity using an array identifier ZAi, but some types of instructions (e.g. data transfer instructions) may also select a sub-portion of the array by defining an index value which selects a part of the array (e.g. one horizontal/vertical group of elements).

Figure 6:
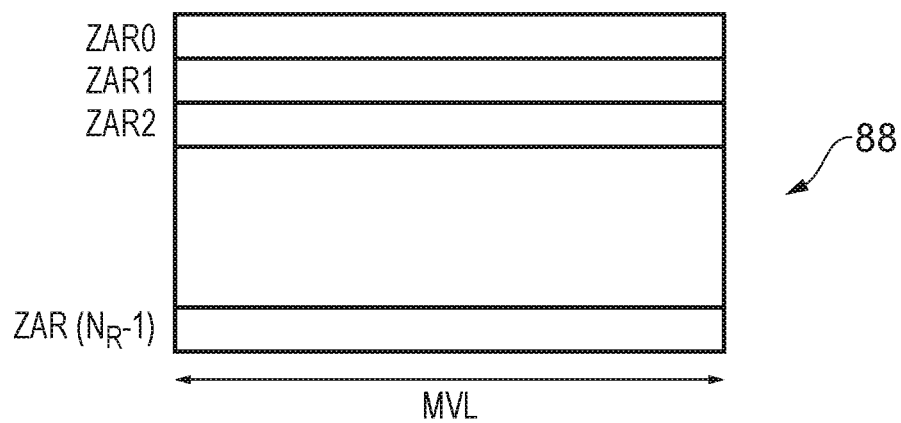
FIG. 6 shows an example of a physical implementation of the array registers.

FIG. 5 shows the architectural view of the array registers as seen by software. However as shown in FIG. 6 in practice the physical implementation of the register storage corresponding to the array registers may comprise a certain number $N_R$ of vector registers, ZAR0-ZAR($N_R$-1). The vector registers ZAR forming the array register storage 88 may be a distinct set of registers from the vector registers Z0-Z31 used for SIMD processing and vector inputs to matrix processing. Each of the vector registers ZAR may have the matrix vector length MVL, so each vector register ZAR may store a 1D vector of length MVL, which may be partitioned logically into a variable number of data elements. For example if MVL is 512 bits then this could be a set of 64 8-bit elements, 32 16-bit elements, 16 32-bit elements, 8 64-bit elements or 4 128-bit elements, for example. It will be appreciated that not all of these options would need to be supported in a given implementation. By supporting variable element size this provides flexibility to handle calculations involving data structures of different precision. To represent a 2D array of data, a group of vector registers ZAR0-ZAR($N_R$-1) can be logically considered as a single entity assigned a given one of the array register identifiers ZA0-ZA($N_A$-1), so that the 2D array is formed with the elements extending within a single vector register corresponding to one dimension of the array and the elements in the other dimension of the array striped across multiple vector registers.

It can be useful, although not essential, to implement the matrix processing circuitry 46, 86 so that the array registers ZA store square arrays of data where the number of elements in the horizontal direction equals the number of elements in the vertical direction. This can help to support on-the-fly transposition of matrices where the row/column dimensions of a matrix structure in memory can be switched on transferring the matrix between the array registers 88 and memory 54, by providing support to read/write the array registers 88 either in the horizontal direction or in the vertical direction. It is common for machine learning algorithms and other applications processing matrix data to represent the data stored in memory either in a row-major format or a column-major format as discussed above, and some algorithms may need to process data in a mix of formats. In previous techniques, if some processing requires input data to be in a different format from its layout in memory, then this may require some rearrangement of the data stored in memory using a number of load/store instructions or vector permute instructions before the data can be processed in the matrix processing operations, to ensure consistency of format. These operations can be slow. By providing support to write/read data from a 2D array register in either the horizontal direction or the vertical direction this can allow data loaded in from memory in one direction (e.g. row by row) to be written back to memory in the opposite direction (e.g. column by column), faster than would be possible with a number of gather/scatter load/store or permute operations to transfer data between memory and vector registers.

Hence, when the array registers ZA 88 are implemented as a set of vector registers ZAR each storing one horizontal/vertical element group of the corresponding 2D array, to ensure that the square matrix constraint is satisfied it may be desirable that the array spans a number of vector registers which is equal to the number of data elements which fit within one vector register. When supporting variable data element sizes as discussed above, the number of data elements that can fit within one vector register is variable and so therefore the number of vector registers which are grouped together to form a single array register ZA may also be variable.

One approach could be that each array register ZA (accessible as an architectural register by specifying the array register ID within an instruction) could correspond to a certain number of vector registers which corresponds to the maximum number of data elements which could fit within one vector register at the minimum data element size supported. However, in this case with a fixed mapping of the array registers onto the physical vector register storage then when the data elements size is larger and fewer data elements fit within one vector register, then some of the fixed set of vector registers mapped to a particular array register identifier would effectively be wasted as the array dimension shrinks.

Therefore, a more efficient implementation can be that the number $N_A$ of array registers is variable depending on data element size E, so that the physical register storage ZAR0-ZAR($N_R$−1) used to implement the array registers ZA can be logically partitioned into different size groups depending on the data element size E, so as to make full use of the available physical storage regardless of the data element size. This means that the actual physical storage region referenced by a given array register identifier ZA0-ZA($N_A$−1) is not always the same, but varies depending on the current data element size E used for a given operation.

FIGS. 7-11 show different ways in which the physical storage can be partitioned and referenced using the architectural register specifiers for the array registers ZA0-ZA($N_A$−1). In the examples of FIGS. 7-11, it is assumed that the matrix vector length MVL is 512 bits, but it will be appreciated that other implementations could use a different matrix vector length, and in this case the particular number of array registers ZA supported or the particular groupings of vector registers ZAR mapped to a given array register may change. Also, this example assumes that the total number of vector registers ZAR provided for the array (matrix) registers 88 is 64, but again this could change in other implementations of the ISA.

Figure 7:
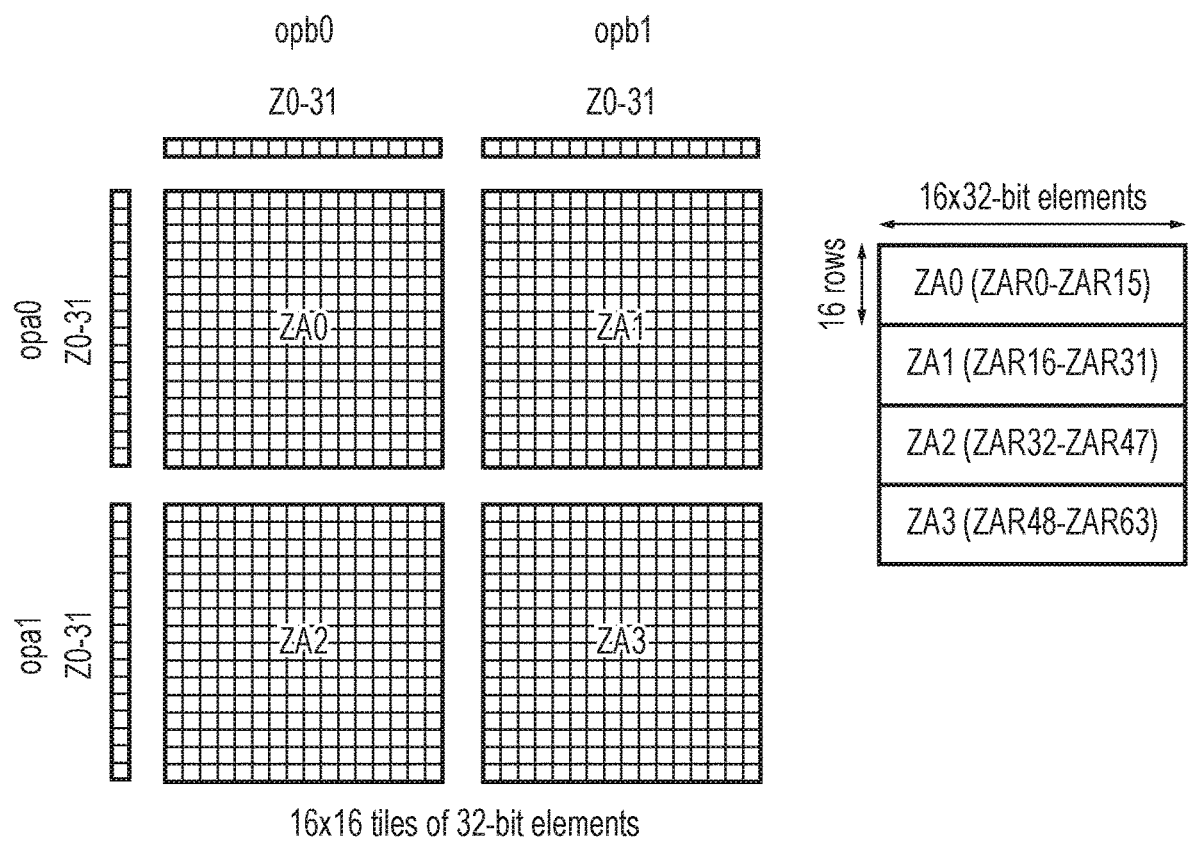

FIG. 7 shows partitioning of the array register storage when the current data element size E is 32 bits. In this case, with 512-bit vector registers, it is possible to fit 16 elements each of size 32 bits within a single vector register. Therefore, to represent a square 2D array, 16 vector registers may be grouped together to represent a single 16×16 2D array identified by a given value of the array register identifier ZA0-ZA($N_A$−1). For example, for array register ID ZA0, this maps to vector registers ZAR0-ZAR15 which may store the 0th to 15th horizontal groups of elements of array ZA0 respectively, and the $i^{th}$ vertical group of elements is striped across the set of elements at position i within each of the vector registers ZAR0-ZAR15 (alternatively, other implementations may arrange the vertical group of elements within a single vector register ZAR and stripe the horizontal group of elements across corresponding element positions of multiple vector registers ZAR).

As 16 vector registers ZR are sufficient to represent a 16×16 tile of 32-bit elements, and there are 64 vector registers in total, this means that 4 separate 16×16 arrays can be stored within the 64 vector registers available, and so for the 32-bit element size the number $N_A$ of array registers supported is 4. That is, the physical storage is divided into 4 groups of 16 vector registers labelled with array identifiers ZA0-ZA3, which can be identified by the data transfer instructions which transfer data between the array storage registers and memory.

As shown on the left hand side of FIG. 7, as it is possible to store four separate 2D arrays ZA0-ZA3 in the array registers 88 simultaneously, so this allows some amortisation of the load/store overhead associated with processing a given amount of matrix data. For example, four distinct output tiles ZA0-ZA3 could be generated from different combinations of four vector operands (e.g. ZA0 based on the outer product of opa0, opb0, ZA1 based on the outer product of opa0, opb1, ZA2 based on the outer product of opa1, opb0 and ZA3 based on the outer product of opa1, opb1 as shown in FIG. 7). This can be useful as matrix processing algorithms may be able to reuse the same input vector in combination with many other input vectors, so enabling multiple outer product results to be calculated from the same instance of the input vector stored in a vector register (one of Z0-Z31) to share the load overhead associated with loading the vectors among a greater number of computation operations, to increase the effective number of multiplications achieved per load, which can help to improve performance compared to loading a pair of input operands opa, opb separately for each individual result tile ZA generated.

Figure 8:
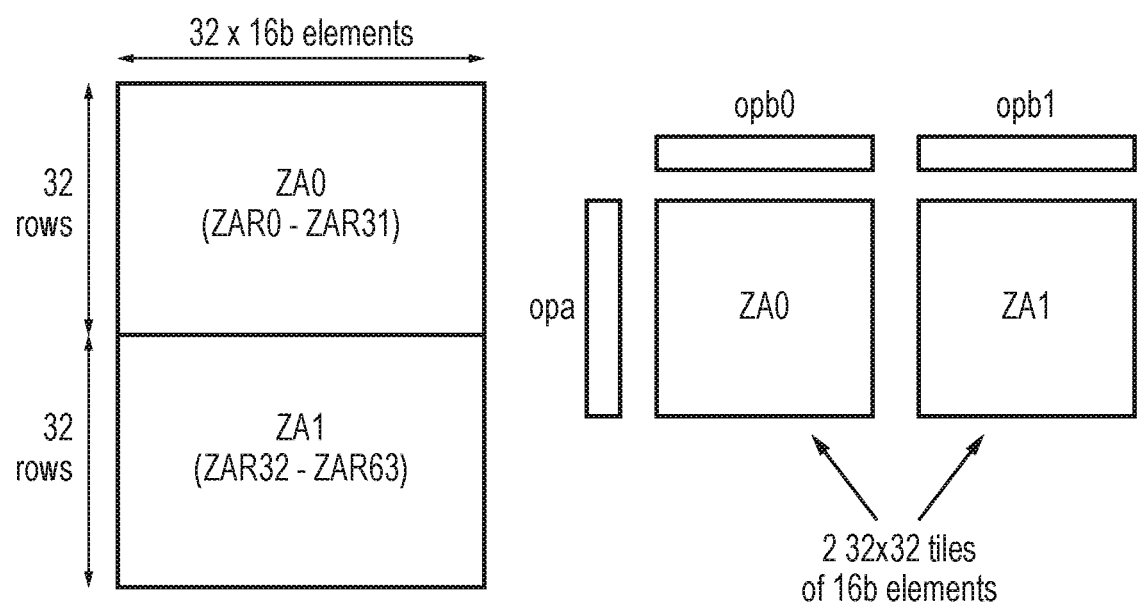
FIG. 7-11 illustrate how the physical storage capacity of the array registers can be logically partitioned into a variable number of architectural array registers.

FIG. 8 shows an alternative partitioning of the physical register storage when the current data element size E is 16 bits, which means that 32 elements fit within one 512-bit vector register (for this example MVL size) and so two groups of 32 vector registers, ZAR0-ZAR31 and ZAR32-ZAR63 are mapped to array identifiers ZA0, ZA1 each representing a 32×32 tile of 16-bit elements. With this approach then the array storage can support performing two separate outer product operations based on a single set of loaded vector operands opa, opb0, opb1 in vector registers to generate two 32×32 tiles ZA0, ZA1 based on outer products of opa with opb0 and opa with opb1 respectively. Hence, compared to FIG. 7, the number of elements within an individual tile is greater (32×32 instead of 16×16) but fewer tiles can be processed for a given set of loads.

Figure 9:
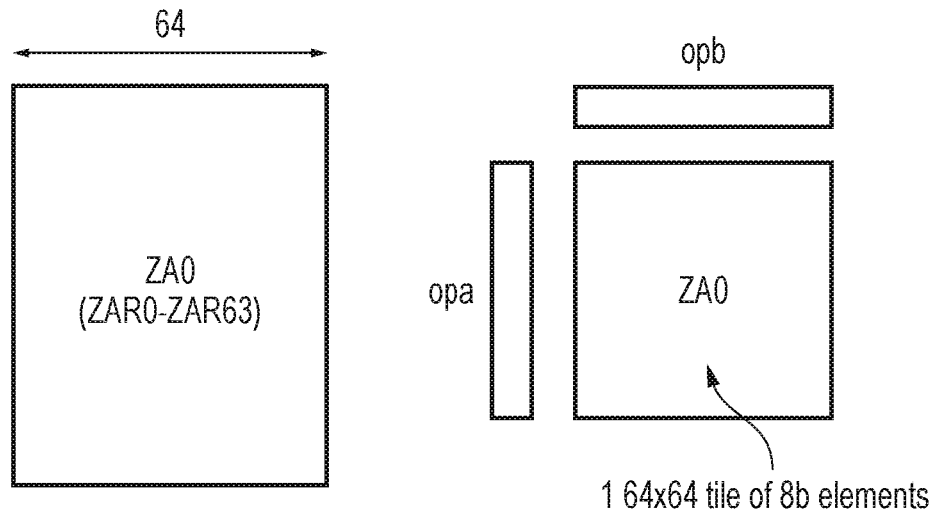

FIG. 9 shows another configuration where the data element size is 8 bits and so 64 elements fit within one vector register, meaning that all 64 vector registers ZAR0-ZAR63 are grouped together to form a single 2D array ZA0. FIG. 9 shows performing a single outer product operation on vectors opa, opb to generate the 64×64 array ZA0 of 8-bit elements. However, in some implementations, the 8-bit element result may not be supported for computation operations, but could be restricted for use in array load/store data transfer or register move data transfer instructions which transfer data between the array register and either memory or a vector register, for use in transposing the row/column directions relative to the data structure in memory.

Figure 10:
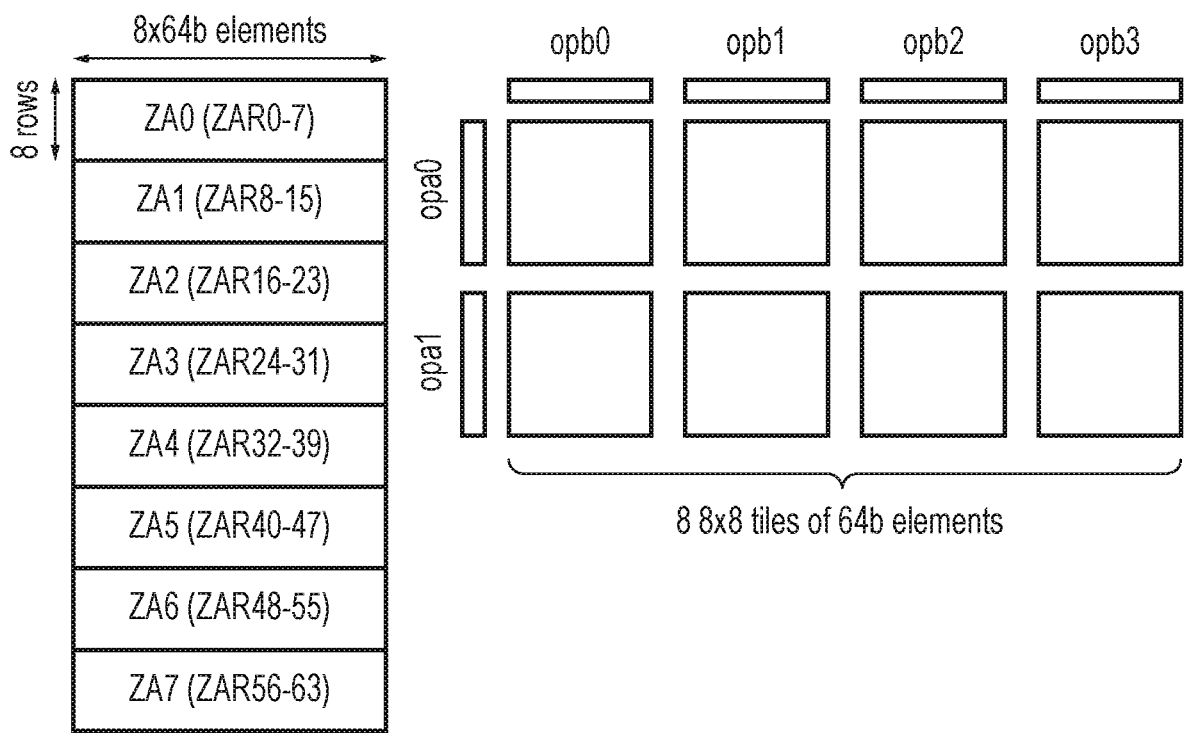
Figure 11:
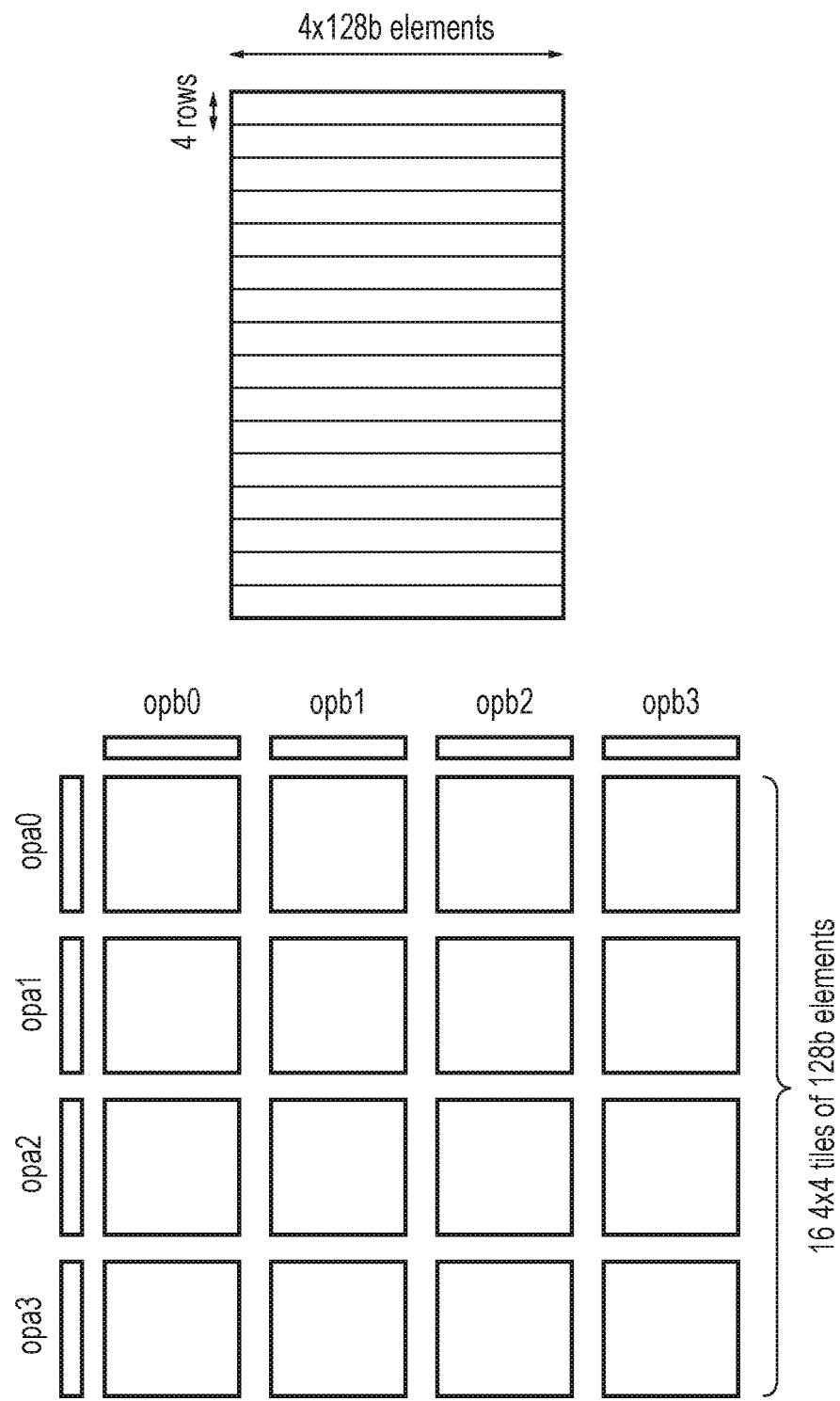

Similarly, FIGS. 10 and 11 show partitioning of the array storage for data element sizes of 64 bits and 128 bits respectively.

It will be appreciated that a similar partitioning may be performed for other matrix vector lengths MVL or other numbers $N_R$ of vector registers provided in the array storage 88.

The outer product instructions which control the processing circuitry to perform the outer product operation may specify vector register identifiers identifying which vector registers Z0-Z31 store the two vector operands for the outer product operation, and may specify a destination array register identifier ZA0-ZA($N_A$−1) which identifies the tile to be updated with the result of the outer product operation. The matrix processing hardware 48, 86 of the processor may determine based on the current data element size E and the specified array register identifier ZAi which physical vector registers ZAR are to be updated based on the outer product result, depending on the variable mapping discussed above.

The ISA may also define array data transfer instructions for transferring a portion of a 2D array to or from a selected array register ZAi. To simplify the implementation of the hardware circuit logic and reduce the amount of data needed to be transferred for any individual instruction, it may be simpler for a given data transfer instruction to act on a single horizontal/vertical group of elements within the selected array register ZAi, rather than transferring the entire 2D array in one instruction. This also helps to support the on-the-fly transposition function discussed earlier, as the instruction may select whether to read/write in the horizontal direction or the vertical direction, depending on a parameter of the data transfer instruction. Hence, in addition to the selected array register, the data transfer instruction may also identify an index identifying which horizontal/vertical group of elements is to be transferred.

Figure 12:
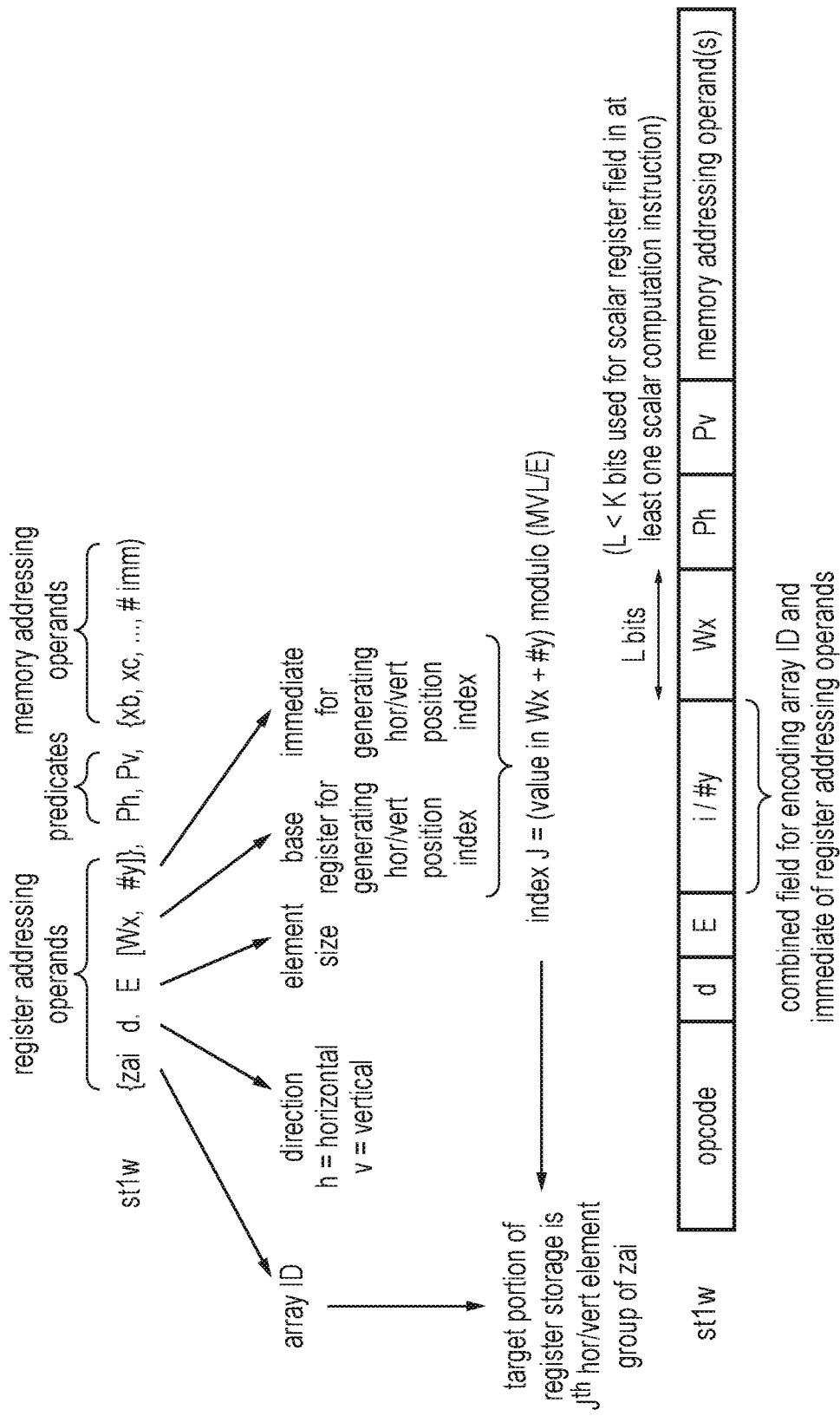
FIG. 12 illustrates an example of encoding of a load/store data transfer instruction for transferring a portion of a 2D array of data between the array register storage and memory.

FIG. 12 shows an example encoding of an array data transfer instruction. In this example, the instruction is a store instruction for transferring data from the 2D array register storage ZA 88 to memory 54. It is also possible to provide an array data transfer instruction which is a load instruction for loading data from memory 54 to the array register storage 88, which specifies its memory addressing information and register addressing information in the same way as shown for the store instruction in FIG. 12.

The upper part of FIG. 12 shows an example syntax of the array data transfer instruction when written in assembly code, while the lower part of FIG. 12 shows a binary encoding of the instruction having various bit fields allocated for representing the different parameters specified in the assembler representation.

As shown in the upper part of FIG. 12, the data transfer instruction specifies a number of parameters, including:
  register addressing information (operands) for identifying the portion of the array register storage 88 to be used for the data transfer,
  memory addressing information (operands) for identifying a target region of memory from which data is to be loaded or to which data is to be stored.
  predicate operands which provide predicate values for controlling the data transfer such that some data elements of an array can be disabled to prevent the memory being updated (in the case of a store instruction) or the register storage being updated (in the case of a load instruction) for an element position corresponding to an inactive element indicated by the predicates. There are two predicate values Ph, Pv corresponding to horizontal and vertical groups of elements in the array respectively.

The memory addressing operands may identify the addresses to be updated in memory according to any known addressing scheme. For example the memory addressing operands could include one or more register identifiers of scalar registers used to derive the address for the load/store operation and zero, one or more immediate values. For example a first scalar register could provide a base address. An offset value could be represented either by the value stored in a second scalar register, or by an immediate value encoded in the instruction encoding directly, where the offset is to be added to the value in the base address register to generate the address for the data transfer. In some cases the memory addressing operands could also include further operands for specifying other information about the addressing mode, for example an operand indicating whether to increment the value in the base address register either prior to calculating the address for the current load/store instruction or after calculating the address. The operands could also include a parameter specifying a shift amount to be applied to the offset represented by the second register or the immediate prior to adding it to the base register value. In general a wide variety of memory addressing modes are known in the art have any such known addressing mode can be used to define the memory addressing operands for the array data transfer instruction.

The register addressing operands of the array data transfer instruction are used to identify which portion of the array register storage 88 should be transferred to memory for the store instruction (for a load instruction, the register addressing operands would identify which portion of the array register storage 88 is to be updated with the loaded data). The register addressing operands include an array identifier (ID) ZAi (or "zai" in the assembler representation used by software), where i represents the number of the particular architectural array register ZA0-ZA(NA-1) that is selected for the current load/store instruction. The register addressing operands also include a direction identifier d which indicates whether the identified array register ZAi should be accessed in the horizontal or vertical direction. The register addressing operands also include an indication of the element size E which is the current element size for the current operation, which can be selected from a number of different element sizes as discussed earlier. Also, the register addressing operands include a base register Wx and an immediate value #y for generating a row/column index J which indicates the position of the horizontal/vertical group of elements within selected array register ZAi for which the data is to be transferred. The base register identifier Wx identifies a scalar register which provides a base value, which is to be added to the offset represented by the immediate value #y directly encoded within the instruction encoding of the data transfer instruction, to generate the index J. In this example, to ensure that the index J is within the range of element positions supported for a given vector length MVL and element size E, the index value J is set to (value in Wx+#y) MODULO (MVL/E). The modulo operation refers to determining the remainder when (value in Wx+#y) is divided by (MVL/E), although in practice as MVL and E are powers of 2, the modulo operation may be implemented simply by returning the low order bits of the sum, since if dim=MVL/E then J is the least significant $\log_2(\text{dim})$ bits of (value in Wx+#y) By representing the row/column index using a combination of a base register and an immediate value, this is useful to support software code which can scale to different dimensions of matrix structure and which supports loop unrolling as will be discussed further below.

In this example, the index value J is represented in the same way regardless of whether the selected access direction for array register ZAi is the horizontal or vertical direction. The direction identifier d selects which particular elements in the group of vector registers ZAR corresponding to selected array register ZAi are read/written. For example, if the direction identifier selects the horizontal direction, the transferred elements are read from, (or for a load instruction, written to) the $J^{th}$ vector register ZAR in the group corresponding to ZAi, and if the direction identifier selects the vertical direction then the transferred elements are read from (or for a load instruction, written to) the $J^{th}$ element in each of the vector registers ZAR in the group corresponding to ZAi (or vice versa if the horizontal/vertical directions are transposed relative to the layout in the vector registers ZAR).

As shown in the lower part of FIG. 12 the binary encoding of the instruction may include an opcode which identifies that this instruction is the array load/store data transfer instruction, as well as a number of fields corresponding to the various parameters specified in the assembler representation of the instruction as described earlier. For example fields of the instruction encoding may be allocated to represent the direction identifier D, the current data element size E, the base register identifier Wx identifying the base register for generating the row/column index of the register addressing operands, the predicate registers Ph and Pv for providing the horizontal and vertical predicate values, and the various memory addressing operands.

In this example the scalar register field Wx for identifying the base register of the register addressing operands has a certain number of bits L which is less than the number of bits K used for scalar register fields in at least one other instruction supported by the decoder 30 and processor (e.g. integer ALU instructions may specify K-bit register fields for their source/destination registers). For example, K=5 in the example of FIG. 5. However, to reduce the size of the base register field in the array load/store data transfer instruction, as shown in FIG. 12 the Wx field may have L bits (L<K) so that there are some scalar registers which are not allowed to be specified as the base register for generating the row/column index for the array data transfer instruction. For example, if L=2 then the data transfer instruction may be restricted to selecting from a limited subset of 4 scalar registers (e.g. W12-W15). This recognises that the instruction already has a large number of parameters to be specified, and for the expected use cases in controlling loops of matrix processing, it may be enough to define only a few different base registers for register addressing within a single program loop, so by limiting the size of the scalar register field for identifying the base register for generating the index J, this makes the instruction coding more efficient and frees up other bit space for representing other parameters. Of course, this is not essential and other implementations may provide a scalar register field Wx which supports any scalar register being identified as the base register for the register addressing operands.

While FIG. 12 shows an example where the current data element size E is directly encoded within the encoding of the instruction using a certain bit field, another option could be that the current data element size could be stored in a control register which can be set by earlier instructions and referenced when processing the array data transfer instruction to identify the current data element size, so that it may not be essential to represent to current data element size E within the instruction encoding itself.

In this example the array ID i and the immediate value #y for generating the row/column index of the register addressing information are represented by a combined field within the instruction encoding of the data transfer instruction. This is shown in more detail in FIG. 13. This combined encoding exploits the fact that for variable data element size E, as the data element size increases the number of distinct 2D arrays which can fit within the available physical array storage increases, while the dimensions of an individual array decreases. Hence, the array ID and the immediate value both depend on the data element size, but with inverse scaling relationships, and this means that it can be efficient to represent the two parameters in a combined field with a constant number of bits of the combined field being variably mapped as part of the array ID for some data element sizes and as part of the immediate value for other data element sizes.

Also, it is recognised that, to support vector length agnostic code which can operate correctly on a range of processor implementations which may have implemented different sizes for the matrix vector length MVL, it is desirable that the particular immediate values specified for the register addressing operands should be set to the same values by the code regardless of the particular matrix vector length MVL implemented. In practice, this means that there is no advantage in providing encoding space for supporting a number of encodings for #y which is greater than the maximum number of data elements which can fit within a single vector register ZAR in a processor implementation operating at the minimum matrix vector length supported, $MVL_{min}$. This is because even though, in implementations with a larger vector length than the minimum, it would be possible to reference a greater number of elements per vector register, the code would not be able to reference those additional data elements directly in the immediate value #y because otherwise the code would no longer be vector length agnostic as it would not function correctly on an implementation implementing the minimum vector length $MVL_{min}$. This means that the size of the combined array ID/immediate field can be selected so that the number of different values supported for the immediate value #y is less than or equal to $MVL_{min}/E$ (in other words for an N-bit immediate, $2^N \leq MVL_{min}/E$) For example if the minimum vector length $MVL_{min}$ supported by the ISA is 128 bits, then 4 bits would be sufficient to represent the immediate value when the current data element size E is 8, since 128/8=16 which can be represented with 4 bits (i.e. 0 to 15).

Figure 13:
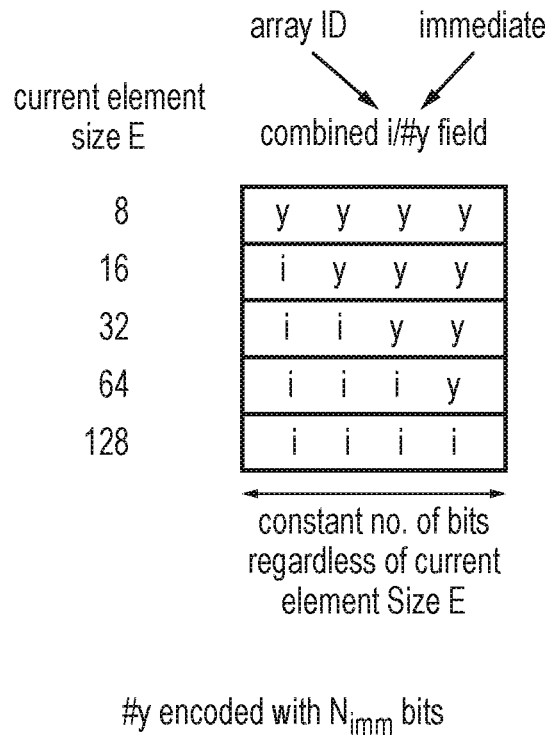
FIG. 13 illustrates an example of encoding an array identifier and an immediate value using a combined field of the instruction encoding of the data transfer instruction.

Hence, as shown in the example of FIG. 13, a 4-bit combined field of the data transfer instruction can represent both the array ID i (defining which array register ZAi is accessed) and the immediate value #y for generating the horizontal/vertical index J. At the smallest data element size supported (e.g. 8 bits), all 4 bits of the combined field may be allocated to representing bits of the immediate value #y, since at this element size then there is no need to specify an array ID at all because as shown in FIG. 9 the entire physical register storage ZAR0-ZAR63 corresponding to the array registers is mapped to a single 2D array ZA0. In this case although there are 64 different element positions in the horizontal/vertical directions, the immediate value #y only scales in the range 0-15 to support implementations where $MVL=MVL_{min}=128$ bits, where only 16 8-bit elements can fit in the single vector register. Accessing element positions in the range 16-63 would require the software code to specify the base value in register Wx as a value other than 0.

On the other hand, at larger data element sizes, fewer bits are needed for the immediate value as the number of data elements of that size which can fit within the vector register of minimum vector length supported decreases, but then in these examples additional bits of the combined field are allocated for representing the array ID i.

FIG. 14 shows an example of program code that can make use of the array data transfer instruction discussed above. The left hand side of FIG. 14 shows high-level program code written by a programmer in a high-level programming language to multiply two matrices A[N×K] and B[K×M] giving a result C[N×M]. The programmer may write a program loop which is intended to step through respective rows/columns of two matrix structures stored in the memory, load the rows/columns for processing and perform a number of outer product operations on pairs of vectors corresponding to a row of one of the matrices and a column of the other, and write the generated the result of accumulating a number of outer product results back to memory.

For example, in FIG. 14 the high-level code shows a loop in which, in each iteration, two columns of matrix A and two rows of matrix B are loaded as input vectors for the outer product operations. Four outer product operations are performed on respective pairs of columns and rows (similar to the example shown in FIG. 7) to generate four separate 2D arrays of output data. The load/computation loop is iterated over different row/column positions of the matrix structures in memory, so that ZA0-ZA3 accumulate the results of multiplying tiles from matrix A and tiles from matrix B. A subsequent store loop stores the respective rows/columns of the result tiles ZA0-ZA3 back to a result matrix structure C in memory. An outer loop iterates over both the load/ computation loop and the store loop to iterate over other combinations of tiles of the matrices A and B.

The right hand side of FIG. 14 shows the compiled assembler representation of the high-level code on the left hand side of FIG. 14. Within the inner loop (load/computation loop) there are some vector load instructions which load vector registers Z4-Z7 with the respective columns or rows of matrices A/B in memory, and outer product instructions FMOPA which generate the outer product results written to array registers ZA0-ZA3, from the respective pairs of vector operands in vector registers Z4-Z7. In this example the element size is 32 bits and so there are 4 tiles that can be generated within a single iteration of the inner loop (given the example of FIG. 7). In this example the data element size of E=32 bits is represented by having an element size identifier .s within the assembler representation of the various load/store and outer product instructions. The outer product instructions are outer-product-and-accumulate instructions, so for example the instruction "fmopa za0.s . . . " adds the previous contents of each element of array register ZA0 to the element generated in the outer product operation performed on vector operands in vector registers Z4 and Z6.

The loop at the bottom part of the assembler code in FIG. 14 includes the array store data transfer instructions "st1w" which are used to transfer the generated 2D arrays from array registers ZA0-ZA3 to memory. These have the encoding discussed with respect to FIG. 12. In this example, the base registers x17, w12 used for memory addressing information and register addressing information respectively, and a compare instruction "cmp" compares the value in w12 (which also functions as a loop counter in this example) to enable a branch instruction "blt" determine whether to terminate the loop.

FIG. 14 shows an example of the assembler code where the compiler has not used loop unrolling when generating the store loop at the lower part of the code. In this example the immediate value for each of the four store instructions is #0 so that the index value used to select the particular row/column to be stored from a given 2D array ZA0-ZA3 is simply identified by the value stored in the base register W12.

However, with such an implementation of code there is a certain amount of overhead in each loop iteration of the store loop, in the "add" instruction for incrementing w12 and the compare and branch instructions "cmp", "blt" used to determine whether to terminate the loop. The overhead associated with these loop controlling instructions can be reduced by performing loop unrolling where multiple iterations of the loop are unrolled into a single iteration of a larger loop which included explicit instructions which would have corresponded to multiple iterations in the original loop. For example the store loop shown in FIG. 14 could be replaced with code as follows:

```
        mov     w12, #0
1:      st1w    {   za0h.s[w12,  #0]  },  p0,  p4,  [x17,  xzr,  lsl  #2]
        st1w    {   za1h.s[w12,  #0]  },  p0,  p5,  [x17,  x2,   lsl  #2]
        st1w    {   za2h.s[w12,  #0]  },  p1,  p4,  [x17,  x3,   lsl  #2]
        st1w    {   za3h.s[w12,  #0]  },  p1,  p5,  [x17.  x4,   lsl  #2]
        st1w    {   za0h.s[w12,  #1]  },  p0,  p4,  [x18,  xzr,  lsl  #2]
        st1w    {   za1h.s[w12,  #1]  },  p0,  p5,  [x18,  x2,   lsl  #2]
        st1w    {   za2h.s[w12,  #1]  },  p1,  p4,  [x18,  x3,   lsl  #2]
        st1w    {   za3h.s[w12,  #1]  },  p1,  p5,  [x18,  x4,   lsl  #2]
        st1w    {   za0h.s[w12,  #2]  },  p0,  p4,  [x19,  xzr,  lsl  #2]
        st1w    {   za1h.s[w12,  #2]  },  p0,  p5,  [x19,  x2,   lsl  #2]
        st1w    {   za2h.s[w12,  #2]  },  p1,  p4,  [x19,  x3,   lsl  #2]
        st1w    {   za3h.s[w12,  #2]  },  p1,  p5,  [x19.  x4,   lsl  #2]
        st1w    {   za0h.s[w12,  #3]  },  p0,  p4,  [x20,  xzr,  lsl  #2]
        st1w    {   za1h.s[w12,  #3]  },  p0,  p5,  [x20,  x2,   lsl  #2]
        st1w    {   za2h.s[w12,  #3]  },  p1,  p4,  [x20,  x3,   lsl  #2]
        st1w    {   za3h.s[w12,  #3]  },  p1,  p5,  [x20.  x4,   lsl  #2]
        add     x17, x17, x2,     lsl  #3  //  x17  += 2*dim
        add     x18, x18, x2,     lsl  #3  //  x18  += 2*dim
        add     x19, x19, x2,     lsl  #3  //  x19  += 2*dim
        add     x20, x20, x2,     lsl  #3  //  x20  += 2*dim
        add     w12, w12, #4
        cmp     w12, dim
        blt     1b
        [ ... ]
        mstop
``` direction identifier d specifies the horizontal direction (as signified by zaih.s in the assembler representation), so the base register W12 and the immediate value #0 shown in the example of FIG. 14 are used to generate the index value J which identifies the particular horizontal group of elements of the selected array register ZAi (one of ZA0-ZA3) to be transferred to memory in response to the corresponding store instruction. A loop is constructed which iterates with the value in the base register W12 being incremented for each iteration of the loop so that the store instructions step through each horizontal group of elements of the generated 2D arrays until all the elements of each of the generated arrays ZA0-ZA3 have been stored to memory. The "add" instructions at the bottom of the store loop increment the In this example, four separate iterations of the original loop can be unrolled into a single iteration of the new loop, which reduces the number of times the "add" instruction for incrementing w12 and the compare and branch instructions are executed. Further performance improvement could be achieved if the memory addressing information for generating the memory address uses a base+immediate addressing mode with an additional immediate offset indicating a multiple of the element size added to the base value to generate the target memory address, as in this case different store instructions could target different addresses for the unrolled loop iterations, based on a single register x17, to further eliminate the 3 add instructions for incrementing registers x18-x20 on each loop iteration.

It will be appreciated that the above code is just one example, but it helps to illustrate why representing the horizontal/vertical position index J using a base register and an immediate value in the register addressing information can be useful to support loop unrolling by a compiler, as well as supporting scalable code which can operate with different dimensions of data structures (see the variable dim shown in FIG. 14 which represents the dimension of the ZA matrix tile to be computed per iteration).

The example of FIG. 12 shows an array data transfer instruction which is a load/store instruction, where the data is transferred between the target portion of the array register storage 88 and memory 54.

Figure 15:
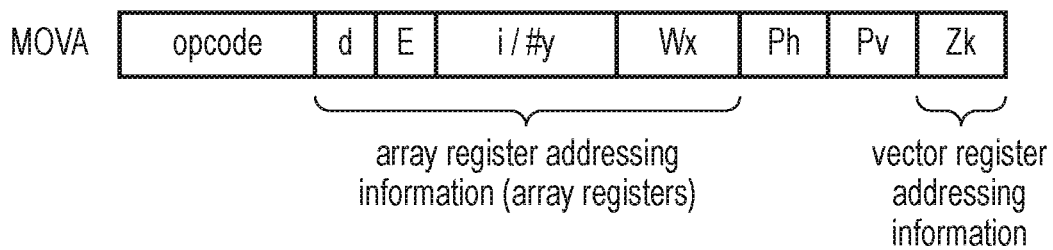
FIG. 15 illustrates an example of a register move data transfer instruction, for transferring a portion of a 2D array of data between an array register and a vector register.

Another example of a data transfer instruction using register addressing information to access the array registers 88 is shown in FIG. 15. FIG. 15 shows a register move instruction for transferring data between the array registers 88 and the vector registers 82. The opcode has a different value to the opcode of the load/store array data transfer instruction of FIG. 12. The register addressing information of the register move instruction is encoded in the same way as in the example of FIG. 12. However, instead of providing memory addressing information identifying a target region of memory, the register move instruction specifies a vector register identifier Zk which specifies a selected vector register 82. Different variants of a register move instruction can be provided (represented by different opcodes). For example there may be a vector-to-array register move variant which controls the processing circuitry to transfer a vector of elements from vector register Zk to horizontal/vertical group of elements J of selected array register ZAi, as identified based on the array register addressing information including the direction identifier d, the array register ID i, the element size E, the base register Wx and the immediate #y in the same way as discussed above for the example of FIG. 12. Similarly, there may be an array-to-vector register move variant which controls the processing circuitry to move data from horizontal/vertical group of elements J of selected array register ZAi to vector register Zk. Both forms of instruction can be useful to support certain matrix processing algorithms, where sometimes it may be needed to perform some manipulations of elements within a single row/column of a matrix, before or after performing a 2D operation on the matrix as a whole. The register move instructions can support transferring elements to/from the vector registers to enable such single row/column manipulations to be performed.

Figure 16:
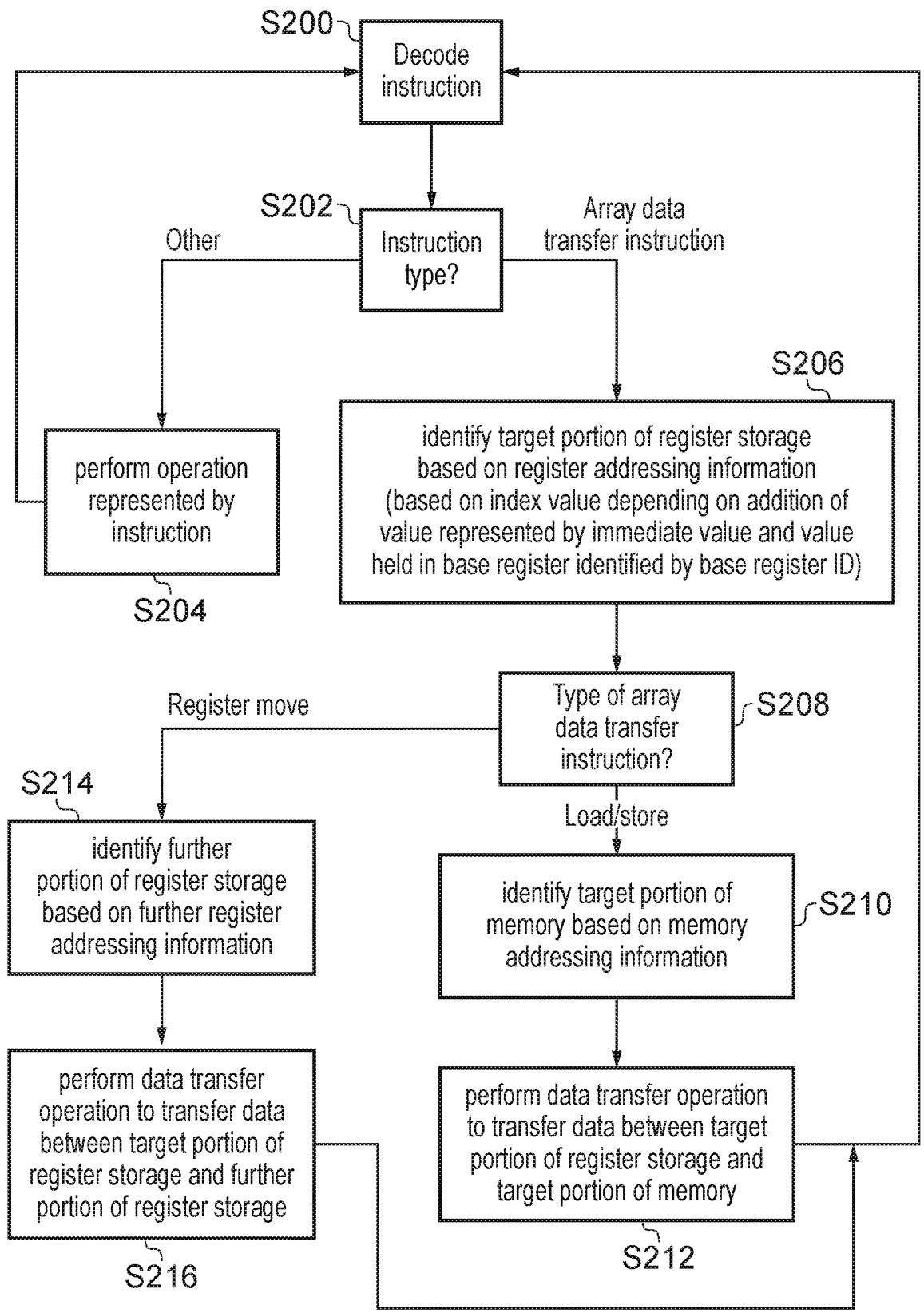
FIG. 16 is a flow diagram showing a method of processing instructions.

FIG. 16 shows a flow diagram illustrating the processing of a data transfer instruction such as the array data transfer instruction described above. At step S200 the next instruction awaiting processing is decoded by the instruction decoder 30 and at step S202 the instruction decoder 30 identifies the type of instruction that was decoded. If the instruction is not an array data transfer instruction then at step S204 the operation represented by the instruction is performed by the processing circuitry under the control of the instruction decoder 30 and the method returns to step S200 to decode the next instruction.

If the instruction decoded by the instruction decoder 30 is identified to be an array data transfer instruction, then at step S206 the instruction decoder 30 and/or the execute stage 36 of the CPU 60 or co-processor 70 identifies a target portion of register storage to use for the data transfer operation, with the target portion of the register storage identified based on the register addressing information of the data transfer instruction. The register addressing information includes a base register identifier and an immediate value. The processing circuitry generates an index value J based on an addition of a value represented by the immediate value and the value held in the base register identified by the base register identifier. The index value J is used to select the target portion of register storage which is to be subject to the data transfer.

At step S208 the processing circuitry (under control of the instruction decoder) identifies the type of array data transfer instruction decoded. While step S208 is shown after step S206 for conciseness, in other examples it could also be performed before step S206 with step S206 in that case appearing on both alternative branches of processing following step S208.

If the data transfer instruction is a load/store instruction similar to the example of FIG. 12, then at step S210 the processing circuitry determines a target portion of memory to be used in the data transfer, based on memory addressing information specified by the instruction. This can be done according to any known addressing mode and could be based on either registers identified by the instruction or immediate values identified by the instruction encoding.

At step S212 the processing circuitry is then controlled by the instruction decoder 30 to perform a data transfer operation to transfer data between the target portion of register storage and the target portion of memory. If the instruction is a load instruction then the data transfer operation comprises loading data from the target portion of memory and storing it in the target portion of register storage. If the instruction is a store instruction then the data transfer comprises storing data from the target portion of register storage to the target portion of memory. The method then returns to step S200 to decode the next instruction.

If at step S208 the array data transfer instruction is determined to be a register move instruction (similar to FIG. 15), then at step S214 a further portion of register storage is identified based on further register addressing information (e.g. based on a register field Zk in the instruction encoding identifying which register is the further portion of register storage). At step S216 a data transfer operation is performed to transfer data between the target portion of register storage identified based on the base register Wx and immediate #y and the further portion of register storage (in either direction depending on the particular instruction type executed). Again, the method returns to step S200 to decode the next instruction.

The example of FIGS. 12 and 15 show array data transfer instructions comprising register addressing information which uses a base register and an immediate value to represent an index value used for selecting the target portion of array register storage 88 to use in the data transfer. However such an encoding of register addressing information could also be used for other types of instruction, which access types of registers other than array registers 88 for storing 2D arrays of data. More generally, the encoding of the register addressing information in this way could be useful for instructions which are intended to process portions of data which could have variable dimensions, while supporting loop unrolling.

Figure 17:
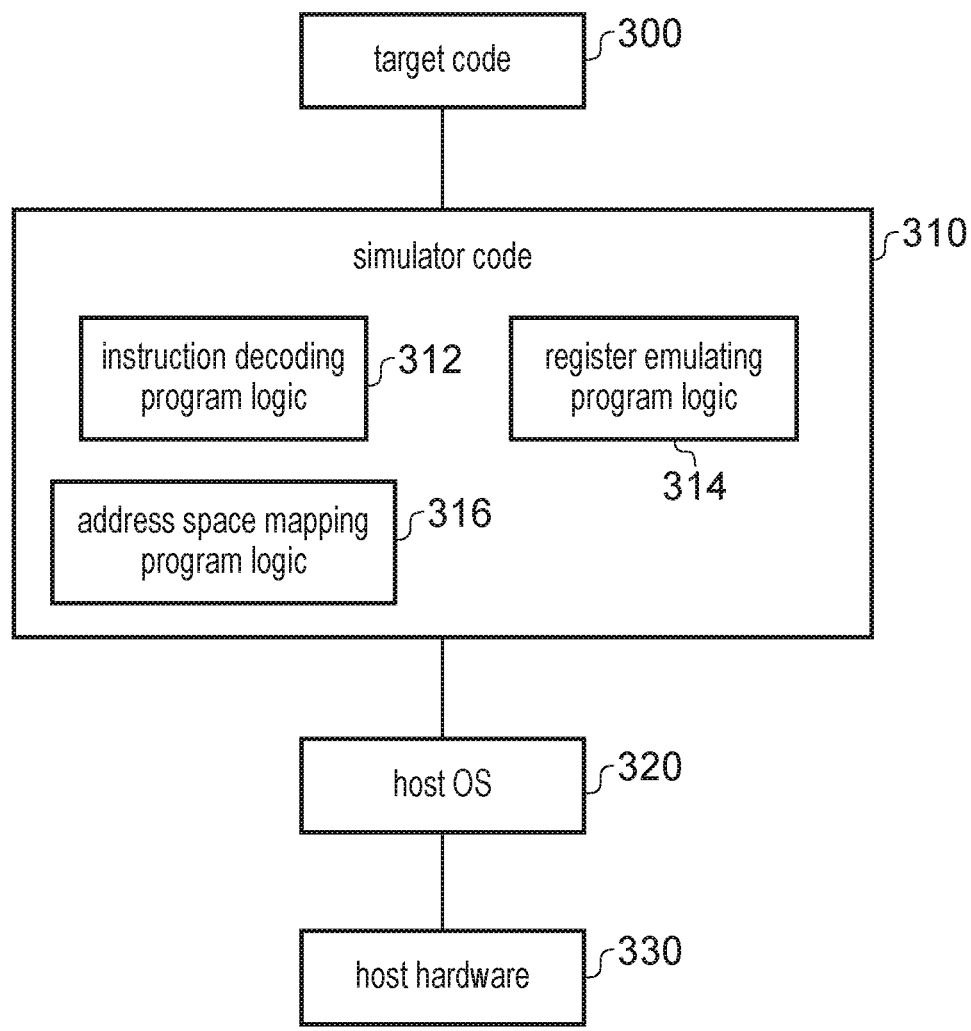
FIG. 17 shows a simulator example which may be used.

FIG. 17 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the interface of the hardware architecture being modelled by the simulator program 310. Thus, the program instructions of the target code 300, including mixed-element-size instructions described above, may be executed from within the instruction execution environment using the simulator program 310, so that a host computer 330 which does not actually have the hardware features of the apparatus discussed above can emulate these features.

Hence, one example provides a simulator computer program 310 which, when executed on a host data processing apparatus, controls the host data processing apparatus to provide an instruction execution environment for execution of instructions of target code; the computer program comprising: instruction decoding program logic 312 to decode program instructions to control the host data processing apparatus to perform data processing in response to the program instructions; and register emulating program logic 314 to maintain a data structure in the host storage of the host hardware 330, to emulate the architectural registers 80, 82, 88 defined in the simulated ISA supported by the target code. The computer program may be stored on a computer-readable recording medium. The recording medium may be a non-transitory recording medium.

For example, the instruction decoding program logic 312 may comprise instructions which check the instruction encoding of program instructions of the target code, and map each type of instruction onto a corresponding set of one or more program instructions in the native instruction set supported by the host hardware 330 which implement corresponding functionality to that represented by the decoded instruction. The register emulating program logic 314 may comprise sets of instructions which maintain a data structure in the virtual address space of the host data processing apparatus 330 and/or in registers of the host apparatus 330, where the register emulating data structure represents the register contents of the registers 80, 82, 88 which the target code expects to be provided in hardware, but which may not actually be provided in the hardware of the host apparatus 330. Instructions in the target code 300, which in the simulated instruction set architecture reference certain registers, may cause the register emulating program logic 314 to access the registers of the host 330 or generate load/store instructions in the native instruction set of the host apparatus, to request reading/writing of the corresponding simulated register state.

The instruction decoding program logic 312 may support data transfer instructions which use register addressing information defined using a base register and immediate, in the same way as discussed above for the hardware embodiments. In the case of the simulator example of FIG. 17, when the instruction processed in the target code is a load/store form of the data transfer instruction, then in response to the load/store data transfer instruction specifying register addressing information for identifying a target portion of the register storage and memory addressing information for identifying a target portion of simulated memory, the instruction decoding program logic 312 controls the host 330 to perform a data transfer operation to transfer data between locations of the register emulating data structure mapped to the target portion of the register storage and locations in the host storage of the host data processing apparatus mapped to the target portion of simulated memory.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   instruction decoding circuitry configured to decode instructions;
   register storage configured to store data; and
   processing circuitry configured to perform data processing in response to an instruction decoded by the instruction decoding circuitry, to generate a processing result to be written to at least one register of the register storage; in which:
   in response to a data transfer instruction specifying register addressing information for identifying a target portion of the register storage, the instruction decoding circuitry is configured to control the processing circuitry to perform a data transfer operation to transfer data to or from the target portion of the register storage; and the register addressing information includes at least:
a base register identifier identifying a base register of the register storage for storing a base value; and
an immediate value specified in an encoding of the data transfer instruction, the immediate value representing a value to be added to the base value to provide an index value for selecting the target portion of the register storage.

2. The apparatus according to claim 1, in which the register storage comprises two-dimensional (2D) array register storage configured to store at least one 2D array of data; and the target portion of the register storage comprises a target portion of the 2D array register storage.

3. The apparatus according to claim 2, in which the data transfer operation comprises transferring a sub-portion of a target 2D array to or from the target portion of the 2D array register storage, the index value identifying which sub-portion of the target 2D array is to be transferred.

4. The apparatus according to claim 3, in which the sub-portion comprises a single horizontal group of elements sharing a same vertical position within the target 2D array or a single vertical group of elements sharing a same horizontal position within the target 2D array.

5. The apparatus according to claim 3, in which the data transfer instruction specifies an array direction identifier identifying one of a horizontal direction and a vertical direction;

when the array direction identifier identifies the horizontal direction, the sub-portion of the target 2D array comprises at least one horizontal group of elements of the target 2D array identified by the index value, each horizontal group of elements comprising elements sharing a same vertical position within the target 2D array; and when the array direction identifier identifies the vertical direction, the sub-portion of the target 2D array comprises at least one vertical group of elements of the target 2D array identified by the index value, each vertical group of elements comprising elements sharing a same horizontal position within the target 2D array.

6. The apparatus according to claim 3, in which the data transfer instruction is associated with a current data element size E specified for the data transfer instruction from among a plurality of data element sizes supported by the processing circuitry, the current data element size E identifying a data element size associated with each element of the target 2D array.

7. The apparatus according to claim 6, in which the immediate value is encoded using $N_{imm}$ bits of an instruction encoding of the data transfer instruction, where $N_{imm}$ is variable depending on the current data element size E, with $N_{imm}$ increasing as E decreases.

8. The apparatus according to claim 3, in which the 2D array register storage comprises $N_R$ vector registers each comprising MVL bits;

the instruction decoding circuitry is configured to decode instructions according to an instruction set architecture supporting a variable vector length MVL for the $N_R$ vector registers of the 2D array register storage, where a minimum vector length supported by the instruction set architecture is $MVL_{min}$; and for the data transfer instruction for which elements of the target 2D array have a data element size E, a number of different numeric values capable of being encoded as the immediate value in the instruction encoding of the data transfer instruction is less than $MVL_{min}/E$.

9. The apparatus according to claim 2, in which the 2D array register storage is capable of being logically partitioned into at least two array storage regions, each array storage region for storing a respective 2D array; and the register addressing information also includes an array identifier identifying a selected array storage region of the 2D array register storage, the index value identifying which sub-portion of the selected array storage region is the target portion of the register storage.

10. The apparatus according to claim 9, in which the processing circuitry is configured to identify which portion of the 2D array register storage is the array storage region corresponding to a given value of the array identifier based on a variable mapping, the variable mapping depending on a current data element size E specified for the data transfer operation.

11. The apparatus according to claim 10, in which the 2D array register storage is logically partitioned into $N_A$ array storage regions, and $N_A$ varies depending on the current data element size E with $N_A$ increasing as E increases.

12. The apparatus according to claim 9, in which the array identifier and the immediate value are encoded using a shared portion of bits of an instruction encoding of the data transfer instruction, and for a given bit of the shared portion, the instruction decoding circuitry is configured to vary, depending on a current data element size E specified for the data transfer instruction, whether the given bit is interpreted as indicating part of the array identifier or indicating part of the immediate value.

13. The apparatus according to claim 12, in which a total number of bits of the instruction encoding of the data transfer instruction used to encode the array identifier and the immediate value is constant regardless of the current data element size E.

14. The apparatus according to claim 1, in which when the data transfer instruction is a load/store instruction specifying the register addressing information and memory addressing information for identifying a target portion of memory, the data transfer operation comprises transferring data between the target portion of the register storage and the target portion of memory.

15. The apparatus according to claim 1, in which when the data transfer instruction is a register move instruction specifying the register addressing information and further register addressing information for identifying a further portion of the register storage, the data transfer operation comprises transferring data between the target portion of the register storage and the further portion of the register storage.

16. The apparatus according to claim 1, in which the base register is a scalar register.

17. The apparatus according to claim 1, in which the instruction decoder is configured to support at least one scalar computation instruction having a K-bit scalar register field for specifying a source or destination register; and the data transfer instruction specifies the base register using an L-bit scalar register field, where L<K so that at least one scalar register specifiable as the source or destination register for the at least one scalar computation instruction is incapable of being specified as the base register of the register addressing information for the data transfer instruction.

18. A method comprising:
decoding an instruction; and
in response to the decoded instruction, controlling processing circuitry to perform data processing to generate a processing result to be written to at least one register of register storage; in which:
in response to a data transfer instruction specifying register addressing information for identifying a target portion of the register storage, the processing circuitry is controlled to perform a data transfer operation to transfer data to or from the target portion of the register storage; and
the register addressing information includes at least:
  a base register identifier identifying a base register of the register storage for storing a base value; and
  an immediate value specified in an encoding of the data transfer instruction, the immediate value representing a value to be added to the base value to provide an index value for selecting the target portion of the register storage.

19. A non-transitory, computer-readable storage medium storing a program computer program for controlling a host data processing apparatus to provide an instruction execution environment for execution of instructions of target code, the computer program comprising:

instruction decoding program logic to decode instructions of the target code to control the host data processing apparatus to perform processing operations corresponding to the decoded instructions; and
register emulating program logic to maintain a register emulating data structure in host storage of the host data processing apparatus to emulate register storage of a target instruction set architecture associated with the target code; in which
in response to a data transfer instruction specifying register addressing information for identifying a target portion of the register storage, the instruction decoding program logic is configured to control the host data processing apparatus to perform a data transfer operation to transfer data to or from locations of the register emulating data structure corresponding to the target portion of the register storage; and
the register addressing information includes at least:
  a base register identifier identifying a base register of the register storage for storing a base value; and
  an immediate value specified in an encoding of the data transfer instruction, the immediate value representing a value to be added to the base value to provide an index value for selecting the target portion of the register storage.

* * * * *